(12) United States Patent
Kaulgud et al.

(10) Patent No.: US 8,839,211 B2
(45) Date of Patent: Sep. 16, 2014

(54) EVALUATING AND ENFORCING SOFTWARE DESIGN QUALITY

(75) Inventors: Vikrant Shyamkant Kaulgud, Maharashtra (IN); Santonu Sarkar, Karnataka (IN)

(73) Assignee: Accenture Global Services Limited, Dublin (IE)

( * ) Notice: Subject to any disclaimer, the term of this patent is extended or adjusted under 35 U.S.C. 154(b) by 751 days.

(21) Appl. No.: 13/050,339

(22) Filed: Mar. 17, 2011

(65) Prior Publication Data

US 2011/0231828 A1  Sep. 22, 2011

(30) Foreign Application Priority Data

Mar. 18, 2010 (IN) .............................. 716/CHE/2010
Oct. 6, 2010 (IN) ............................ 2959/CHE/2010

(51) Int. Cl.
*G06F 9/44* (2006.01)
*G06F 11/36* (2006.01)

(52) U.S. Cl.
CPC .............. *G06F 11/3616* (2013.01); *G06F 8/77* (2013.01)
USPC ............ 717/131; 717/123; 717/141; 717/154

(58) Field of Classification Search
USPC .......................................... 717/131, 123, 141
See application file for complete search history.

(56) References Cited

U.S. PATENT DOCUMENTS

| | | | |
|---|---|---|---|
| 4,937,765 A * | 6/1990 | Shupe et al. ................... | 702/187 |
| 7,003,560 B1 * | 2/2006 | Mullen et al. ................. | 709/223 |
| 2002/0170048 A1 * | 11/2002 | Zgarba et al. ................. | 717/168 |
| 2003/0182645 A1 * | 9/2003 | Fairbanks ........................ | 716/5 |
| 2004/0088198 A1 * | 5/2004 | Childress et al. ............... | 705/4 |
| 2005/0010899 A1 * | 1/2005 | Kung et al. .................... | 717/108 |
| 2007/0027652 A1 * | 2/2007 | Hosagrahara .................. | 702/182 |
| 2007/0157116 A1 * | 7/2007 | Johnson et al. ............... | 715/808 |
| 2007/0220497 A1 * | 9/2007 | Chudukatil et al. .......... | 717/140 |
| 2009/0044055 A1 * | 2/2009 | Wang et al. ..................... | 714/27 |
| 2009/0055804 A1 * | 2/2009 | Blaschek et al. ............. | 717/126 |
| 2009/0070734 A1 * | 3/2009 | Dixon et al. .................. | 717/102 |
| 2010/0023928 A1 * | 1/2010 | Hentschel et al. ............ | 717/124 |
| 2010/0070948 A1 * | 3/2010 | Rama et al. .................... | 717/105 |
| 2010/0251027 A1 * | 9/2010 | Yawalkar et al. ............... | 714/38 |
| 2010/0313179 A1 * | 12/2010 | Groves et al. ................. | 717/101 |

FOREIGN PATENT DOCUMENTS

WO    WO2007041242 A2    4/2007

OTHER PUBLICATIONS

MAAG ("Microsoft Application Architecture Guide 2nd Edition"), Nov 20, 2009.*
Micallef ("An Automated Software Quality Measurement Tool"), 2001.*

(Continued)

*Primary Examiner* — Chat Do
*Assistant Examiner* — Jae Jeon
(74) *Attorney, Agent, or Firm* — Fish & Richardson P.C.

(57) ABSTRACT

Evaluation and enforcement of software design quality, in which a system applies design quality rules to a design of a software application to detect violations and provides output describing one or more violations of the design quality rules detected. Based on the output, the system receives user input to address the one or more violations of the design quality rules and, subsequent to receiving the user input, evaluates code developed for the software application for violations of the design quality rules to assess quality of the code being developed for the software application based on the design of the software application.

19 Claims, 31 Drawing Sheets

(56) References Cited

OTHER PUBLICATIONS

Schneidewind et al., IEEE Software Quality Metrics Methodology Working Group, "IEEE Standard for a Software Quality Metrics Methodology," IEEE Std 1061-1992, Mar. 12, 1993 (pp. 1-40) XP-002440855.

Extended European Search Report for Application No. 11002214.2—1225 dated Jul. 6, 2011, 7 pages.

* cited by examiner

| Rule | Scope | Explanation |
|---|---|---|
| Excessive Fan-In Metric | Class | Reports the number of classes that depend on a particular class. |
| Excessive Inheritance 604 | Class | A class with high levels of inheritance may become a bottleneck in extensibility and changes to such a class can impact children of the class. |
| Godly Class 606 | Class | A class with a large amount of behavior can be considered for refactoring. Only functional classes should be considered. |
| High Coupling And High Inheritance And High Dep_Out (L) 608 | Class | A class with many inbound dependencies and high inheritance may represent a brittle class. If such a class fails (e.g., in testing), the dependent classes may be affected. |
| Non API Method Access (L) 610 | Class | Ideally, a class has public methods only if that particular functionality is accessed by other classes (especially classes from outside the class's package). If this is not case, public methods in a class may lead to erroneous usage of functionality and break the API of the system. |
| Private Constructor Found In Class 612 | Class | Private constructors may be used for preventing class instantiation. Private constructors are, however, not the default. Therefore, private constructors may be marked for further evaluation. |
| Godly Interface 614 | Interface | An interface with a large amount of behavior may be refactored. Since each client of an interface depends on the single class interface, there is an inadvertent coupling between each of the clients. Suppose a client needs additional functionality added to the single class interface. When this functionality is added to the interface, every other client may need to change to support the functionality even though none of them need the functionality. Thus, one change of a client may force a change to propagate throughout the system, which can result in time consuming code maintenance and hard to locate bugs. |
| PIF (Program To Interface Factor) And Violation Of Program To Interface Principle 616 | Package | Reports how a package is coupled to the rest of the system - through interfaces, classes or both. Ideally, a package is coupled only through interfaces. Programming to concrete classes rather than interfaces may lead to low-extensibility packages. |
| Godly Package (L) 618 | Package | A package including too many classes and interfaces is deemed to be "godly", which may mean that a single package includes too much functionality and may be a candidate for refactoring. |
| Violation Of Design To Contract Principle 620 | Package | Reports the class-to-interface balance in a package. A package that has only classes becomes absolutely concrete and is not extensible. A package that has only interfaces is absolutely abstract and can be deemed to be a framework package. |
| Dependency Inversion 622 | Package | Ideally, high-level modules do not depend upon low-level modules and both high-level modules and low-level modules depend only upon abstractions. |
| Omni-Present Package 624 | Package | A package with coupling links to a large number of packages in the system is an omni-present package. Typically such packages are those containing utility classes or core components of a system. If there are too many omni-present packages, refacotoring the system may be considered. |
| Violation Of Open-Close Principle 626 | Package | Ideally, software entities are open for extension but closed for modification. |
| Excessive Remoting 628 | Sequence | A high number of remote colls may impact performance. |
| Encapsulate Classes With A Factory 630 | Class | Having multiple constructors on a class make it hard to decide which constructor to call during development. |

FIG. 6

| Metric | Scope | Explanation |
|---|---|---|
| NOC 702 | Class | The number of children of the class (UML Generalization). |
| OpsInh 704 | Class | The number of inherited operations. |
| AttrInh 706 | Class | The number of inherited attributes. |
| DIT 708 | Class | The depth of the class in the inheritance hierarchy. Longest path from the class to the root of the inheritance tree. |
| NumDesc 710 | Class | The number of children (UML Generalization) of the class, their children, etc. |
| NumAnc- similar to DIT 712 | Class | The number of ancestors of the class. Similar to NumDesc. |
| Dep_In 714 | Class | The number of elements that depend on this class. Counts incoming UML dependencies (dotted arrows). Typically these are method call or parameter type dependencies. |
| NumAssEl 716 | Class (cohesion) | The number of associated elements in the same scope (namespace/package) as the class. Such associations are encouraged, because they do not cross the package boundary, and contribute to the cohesion of the package. This metric considers every form of association: aggregate, composite associations, and incoming, outgoing, or bidirectional associations. |
| NumOps 718 | Class | The number of operations in a class. All operations in the class that are explicitly modeled (e.g., overriding operations, constructors, destructors), regardless of their visibility, owner scope (e.g., class-scope, static), or whether they are abstract. Inherited operations are not counted. |
| Getters 720 | Class | The number of operations with a name starting with 'get', 'is', or 'has'. |
| Setters 722 | Class | The number of operations with a name starting with 'set'. |
| Connectors 724 | Class | The number of connectors owned by the class. |
| NumOps 726 | Interface | The number of operations of the interface |
| Assoc 728 | Interface | The number of elements the interface has an association with. |
| NumAnc 730 | Interface | The number of ancestors of the interface |
| NumIndClients | Interface | The number of elements implementing a descendent of the interface. 732 |
| NumDirClients | Interface | The number of elements directly implementing the interface. 734 |
| NumOpsCls | Package | The number of operations in the classes of the package. 736 |
| NumClsRec | Package | The number of classes in the package, its subpackages, etc. 738 |
| Nesting 740 | Package | Nesting level of the package in the package hierarchy. |
| NumCls 742 | Package | The number of classes in the package. |
| NumInterf 744 | Package | The number of interfaces in the package. |

FIG. 7

Excessive Remote Calls.html _1902_

What you should consider
1. Reduce the number of business objects that are exposed to the client across the service layer over the network.
2. Hide from the client the underlying interactions and interdependence between business components.
3. Provide a uniform, coarse-grained service layer to separate business object implementation from business service abstraction.

Refactoring hints
Use a remote component (Session Bean in case of J2EE Applications) as a façade to encapsulate the complexity of interactions between the business objects participating in a workflow. The Session Façade manages the business objects, and provides a uniform, coarse-grained service access layer to clients.

Example

Before

| clientObj | bizObj1 | bizObj2 |

1:doThis `<remote>`
  2:doThat `<remote>`
  3:doMore `<remote>`
  4:doSomeMore `<remote>`

After

| clientObj | bizFacade | bizObj1 | bizObj2 |

1:do `<remote>`
  1.1:doThis `<local>`
  1.2:doThat `<local>`
  1.3:doMore `<local>`
  1.4:doSomeMore `<local>`

| Properties | Tasks | Console | Bookmarks | DQT Violations View |

| Validation Name | Description | Non-functional attributes impacted | Priority | Design Element |
|---|---|---|---|---|
| Excessive coupling | Number of dependant classes exceeds threshold | Maintainability, Modularity | Medium | CustomerAccountInteraction |
| Excessive Remote Calls | Number of remote calls exceeds threshold | Performance | Severe | CustomerAccountInteraction |

Design Quality Tool
Properties
Alt+Enter  Generate design review document
Check Design

FIG. 19

Design Review Document

Design Review Questions

The questions have been taken from the Design Quality Tool Knowledgebase. The entire knowledgebase Wiki is available at http://dqt-server.com/knowledgebase

| Symptom | Evaluation Questions |
|---|---|
| Collaboration1::Interaction1 | Do methods in a session façade perform behavior other than delegation ? |
| Collaboration1::Interaction1 | Is scalability of the façade object a requirement ? |
| Collaboration1::Interaction1 | Was object pooling considered to address the requirement ? |
| Collaboration1::Interaction1 | Is repeating state cached in a session façade to reduce round trips ? |
| Collaboration1::Interaction1 | If the session façade is implemented as a stateful session bean, is state passivated ? |
| Collaboration1::Interaction1 | Should remote calls secure data/message exchanges ? |

FIG. 20

EVALUATING AND ENFORCING SOFTWARE DESIGN QUALITY

CROSS-REFERENCE TO RELATED APPLICATIONS

This application claims the benefit of priority to Indian Patent Application No. 716/CHE/2010, filed Mar. 18, 2010, and Indian Patent Application No. 2959/CHE/2010, filed Oct. 6, 2010, each of which is incorporated herein by reference in its entirety.

FIELD

The present disclosure generally relates to evaluating and enforcing software design quality.

BACKGROUND

Applications may provide a modeling and development environment that leverages the Unified Modeling Language (UML) for designing architecture for software applications and web services. The applications may include capabilities focused on architectural code analysis and model-driven development with the UML for creating resilient applications and web services.

SUMMARY

In one aspect, a system includes at least one computer and at least one computer-readable medium coupled to the at least one computer having instructions stored thereon which, when executed by the at least one computer, causes the at least one computer to perform operations. The operations include accessing a design of a software application prior to development of code for the software application and accessing design quality rules that are defined to evaluate quality of designs of software applications. The operations also include applying the accessed design quality rules to the accessed design of the software application to detect violations of the accessed design quality rules and providing output describing one or more violations of the accessed design quality rules detected. The operations further include, based on the output, receiving user input to address the one or more violations of the accessed design quality rules and, subsequent to receiving the user input to address the one or more violations of the accessed design quality rules, evaluating code developed for the software application for violations of the accessed design quality rules to assess quality of the code being developed for the software application based on the design of the software application.

Implementations may include one or more of the following features. For example, the operations may include obtaining a recovered software design by reverse engineering the code developed for the software application and applying the accessed design quality rules to the recovered software design to detect violations of the accessed design quality rules. In this example, the operations may include comparing the recovered software design with a version of the design of the software application stored after receiving the user input to address the one or more violations of the accessed design quality rules and, based on comparison results, detecting inconsistencies between the recovered software design and the version of the design of the software application stored after receiving the user input to address the one or more violations of the accessed design quality rules. Output may be provided that describes one or more inconsistencies between the recovered software design and the version of the design of the software application stored after receiving the user input to address the one or more violations of the accessed design quality rules.

In some implementations, the operations may include receiving user input defining a new design quality rule to apply to the accessed design of the software application and applying the new design quality rule to the accessed design of the software application to detect whether the accessed design of the software application violates the new design quality rule. The operations also may include receiving user input defining prioritization of the accessed design quality rules and applying the accessed design quality rules to the accessed design of the software application based on the defined prioritization of the accessed design quality rules.

The operations further may include receiving user input defining specific applicability criteria of the accessed design quality rules for the software application, identifying a subset of the accessed design quality rules to apply to the accessed design of the software application based on the defined specific applicability criteria, and applying the subset of the accessed design quality rules to the accessed design of the software application. In addition, the operations may include receiving user input defining exclusion criteria of the accessed design quality rules for the software application, identifying a subset of the accessed design quality rules to apply to the accessed design of the software application based on the exclusion criteria, and applying the subset of the accessed design quality rules to the accessed design of the software application.

In some examples, the operations may include initializing a violation list for the accessed design of the software application and, for each rule in the accessed design quality rules, identifying a type of design element on which the rule is applied and identifying design elements of the identified type in the accessed design of the software application. For each identified design element, the operations may include applying the rule on the identified design element, determining whether the rule has been violated by the identified design element based on applying the rule on the identified design element, and, conditioned on a determination that the rule has been violated by the identified design element, adding a violation to the violation list based on the rule and the identified design element.

For each identified design element, it may be determined whether the identified design element has been identified to be excluded from design quality analysis and applying the rule on the identified design element and determining whether the rule has been violated are conditioned on a determination that the identified design element has not been identified to be excluded from design quality analysis. In addition, for each identified design element, it may be determined whether the rule has been applied on the identified design element and applying the rule on the identified design element and determining whether the rule has been violated are conditioned on a determination that the rule has not been applied on the identified design element.

In some implementations, the operations may include accessing, from a database, help information related to a detected violation of the accessed design quality rules, generating a context specific help message for the detected violation of the accessed design quality rules based on the accessed help information, and providing output based on the generated context specific help message for the detected violation. The operations also may include accessing, from a database, refactoring information related to a detected violation of the accessed design quality rules, generating a context specific refactoring suggestion for the detected violation of the accessed design quality rules based on the accessed refactoring information, and providing output based on the generated context specific refactoring suggestion for the detected violation. The generated context specific refactoring suggestion may describe a suggestion for correcting the detected violation of the accessed design quality rules. The operations may include receiving user input that updates the accessed design of the software application to correct a detected violation of the accessed design quality rules.

In some examples, the operations may include receiving user input to ignore a detected violation of the accessed design quality rules. In these examples, the operations may include requiring user input of a rationale for ignoring the detected violation to allow the detected violation to be ignored, receiving user input describing the rationale for ignoring the detected violation, and recording the rationale for ignoring the detected violation when ignoring the detected violation. Further, in these examples, the operations may include adding, to an activity log, an entry to indicate that the detected violation has been ignored and the rationale for ignoring the detected violation, and enabling a reviewer to review the activity log including the entry that indicates the detected violation has been ignored and the rationale for ignoring the detected violation.

In addition, the operations may include accessing a partial design of the software application and applying the accessed design quality rules to the partial design of the software application to detect violations of the accessed design quality rules. The operations also may include, subsequent to receiving the user input to address the one or more violations of the accessed design quality rules, generating an unresolved violations report that specifies at least one detected violation that has not been corrected in the design of the software application and providing the unresolved violations report to a reviewer.

In another aspect, a method includes accessing a design of a software application prior to development of code for the software application and accessing design quality rules that are defined to evaluate quality of designs of software applications. The method also includes applying the accessed design quality rules to the accessed design of the software application to detect violations of the accessed design quality rules and providing output describing one or more violations of the accessed design quality rules detected. The method further includes, based on the output, receiving user input to address the one or more violations of the accessed design quality rules and, subsequent to receiving the user input to address the one or more violations of the accessed design quality rules, evaluating code developed for the software application for violations of the accessed design quality rules to assess quality of the code being developed for the software application based on the design of the software application.

In yet another aspect, at least one computer-readable storage medium is encoded with executable instructions that, when executed by at least one processor, cause the at least one processor to perform operations. The operations include accessing a design of a software application prior to development of code for the software application and accessing design quality rules that are defined to evaluate quality of designs of software applications. The operations also include applying the accessed design quality rules to the accessed design of the software application to detect violations of the accessed design quality rules and providing output describing one or more violations of the accessed design quality rules detected. The operations further include, based on the output, receiving user input to address the one or more violations of the accessed design quality rules and, subsequent to receiving the user input to address the one or more violations of the accessed design quality rules, evaluating code developed for the software application for violations of the accessed design quality rules to assess quality of the code being developed for the software application based on the design of the software application.

In a further aspect, a system includes at least one processor and a memory coupled to the at least one processor having instructions stored thereon which, when executed by the at least one processor, causes the at least one processor to perform operations. The operations include accessing a design of a software application and accessing design quality rules associated with at least one design quality attribute. The accessed design quality rules are defined to evaluate quality of designs of software applications in terms of the at least one design quality attribute. The operations also include applying the accessed design quality rules to the accessed design of the software application to detect violations of the accessed design quality rules and accumulating, for the at least one design quality attribute, violations detected by applying the accessed design quality rules to the accessed design of the software application. The operations further include computing a design quality index for the accessed design of the software application based on the accumulated violations and providing output related to design quality of the software application based on the computed design quality index.

Implementations may include one or more of the following features. For example, the operations may include identifying a subset of design quality rules classified as pertaining to the at least one design quality attribute, applying the identified design quality rules to the accessed design of the software application to detect violations of the identified design quality rules, and accumulating all violations detected by applying the identified design quality rules to the accessed design of the software application. In another example, the operations may include accessing all design quality rules defined to evaluate quality of designs of software applications, identifying the detected violations that pertain to the at least one design quality attribute, and accumulating the identified violations that pertain to the at least one design quality attribute.

In addition, the operations may include aggregating, for the at least one design quality attribute, the detected violations across each class included in the accessed design of the software application and accumulating, for the at least one design quality attribute, the detected violations across the design of the software application using the aggregated violations for each class included in the accessed design of the software application. The operations may include counting the detected violations that pertain to the at least one design quality attribute.

In some implementations, the operations may include accessing design quality rules that pertain to multiple, different design quality attributes and accumulating, for each of the multiple, different design quality attributes, detected violations that pertain to the corresponding design quality attribute. In these implementations, the operations may include computing, for each of the multiple, different design quality attributes and based on the violations accumulated for the corresponding design quality attribute, a metric that reflects software design quality in terms of the corresponding design quality attribute and computing a design quality composite index based on the metrics computed for each of the multiple, different design quality attributes. Further, in these implementations, the operations may include accessing design quality rules that pertain to all design quality attributes evaluated by the system.

In some examples, the operations may include accessing design quality rules that pertain to a performance design quality attribute, a security design quality attribute, and a rigidity design quality attribute. In these examples, the operations may include accumulating, for the performance design quality attribute, detected violations that pertain to the performance design quality attribute, accumulating, for the security design quality attribute, detected violations that pertain to the security design quality attribute, and accumulating, for the rigidity design quality attribute, detected violations that pertain to the rigidity design quality attribute. In addition, in these examples, the operations may include computing, for the performance design quality attribute and based on the violations accumulated for the performance design quality attribute, a performance metric that reflects software design quality in terms of the performance design quality attribute, computing, for the security design quality attribute and based on the violations accumulated for the security design quality attribute, a security metric that reflects software design quality in terms of the security design quality attribute, and computing, for the rigidity design quality attribute and based on the violations accumulated for the rigidity design quality attribute, a rigidity metric that reflects software design quality in terms of the rigidity design quality attribute. The operations may include computing a design quality composite index by combining the performance metric, the security metric, and the rigidity metric.

Further, the operations may include accessing a performance weighting factor, a security weighting factor, and a rigidity weighting factor, multiplying the performance metric by the performance weighting factor to determine a performance value, multiplying the security metric by the security weighting factor to determine a security value, and multiplying the rigidity metric by the rigidity weighting factor to determine a rigidity value. The operations also may include summing the performance value, the security value, and the rigidity value to determine the design quality composite index.

In some implementations, the operations may include accessing design quality rules that pertain to a performance design quality attribute, accumulating, for the performance design quality attribute, detected violations that pertain to the performance design quality attribute, and computing a performance metric for the accessed design of the software application based on the accumulated violations that pertain to the performance design quality attribute. The performance metric may reflect software design quality in terms of performance.

In addition, the operations may include accessing design quality rules that pertain to a security design quality attribute, accumulating, for the security design quality attribute, detected violations that pertain to the security design quality attribute, and computing a security metric for the accessed design of the software application based on the accumulated violations that pertain to the security design quality attribute. The security metric may reflect software design quality in terms of security.

Further, the operations may include accessing design quality rules that pertain to a rigidity design quality attribute, accumulating, for the rigidity design quality attribute, detected violations that pertain to the rigidity design quality attribute, and computing a rigidity metric for the accessed design of the software application based on the accumulated violations that pertain to the rigidity design quality attribute. The rigidity metric may reflect software design quality in terms of how flexible the accessed design of the software application is to change.

In some examples, the operations may include accessing design quality rules that pertain to extensibility of the design of the software application, accumulating detected violations that pertain to the extensibility of the design of the software application, and computing a rigidity metric for the accessed design of the software application based on the accumulated violations that pertain to the extensibility of the design of the software application. The operations also may include accessing design quality rules that pertain to modifiability of the design of the software application, accumulating detected violations that pertain to the modifiability of the design of the software application, and computing a rigidity metric for the accessed design of the software application based on the accumulated violations that pertain to the modifiability of the design of the software application.

In some implementations, the operations may include accessing design quality rules that pertain to extensibility of the design of the software application and accessing design quality rules that pertain to modifiability of the design of the software application. In these implementations, the operations may include accumulating detected violations that pertain to the extensibility of the design of the software application and accumulating detected violations that pertain to the modifiability of the design of the software application. Further, in these implementations, the operations may include computing an extensibility metric for the accessed design of the software application based on the accumulated violations that pertain to the extensibility of the design of the software application, computing a modifiability metric for the accessed design of the software application based on the accumulated violations that pertain to the modifiability of the design of the software application, and combining the extensibility metric and the modifiability metric.

In some examples, the operations may include accessing an extensibility weighting factor and a modifiability weighting factor, multiplying the extensibility metric by the extensibility weighting factor to determine an extensibility value, and multiplying the modifiability metric by the modifiability weighting factor to determine a modifiability value. In these examples, the operations may include summing the extensibility value and the modifiability value to determine the rigidity metric.

In some implementations, the operations may include determining an effort estimation value associated with the accessed design of the software application that accounts for the computed rigidity metric. In these implementations, the operations may include determining an effort estimation value for a change to the accessed design of the software application, increasing the determined effort estimation value based on the computed rigidity metric, and providing output related to the change to the accessed design of the software application based on the increased effort estimation value.

In yet another aspect, a method includes accessing a design of a software application and accessing design quality rules associated with at least one design quality attribute. The accessed design quality rules are defined to evaluate quality of designs of software applications in terms of the at least one design quality attribute. The method also includes applying the accessed design quality rules to the accessed design of the software application to detect violations of the accessed design quality rules and accumulating, for the at least one design quality attribute, violations detected by applying the accessed design quality rules to the accessed design of the software application. The method further includes computing a design quality index for the software application based on the accumulated violations and providing output related to design quality of the software application based on the computed design quality index.

In another aspect, at least one computer-readable storage medium is encoded with executable instructions that, when executed by at least one processor, cause the at least one processor to perform operations. The operations include accessing a design of a software application and accessing design quality rules associated with at least one design quality attribute. The accessed design quality rules are defined to evaluate quality of designs of software applications in terms of the at least one design quality attribute. The operations also include applying the accessed design quality rules to the accessed design of the software application to detect violations of the accessed design quality rules and accumulating, for the at least one design quality attribute, violations detected by applying the accessed design quality rules to the accessed design of the software application. The operations further include computing a design quality index for the accessed design of the software application based on the accumulated violations and providing output related to design quality of the software application based on the computed design quality index.

Implementations of any of the techniques described throughout the disclosure may include a method or process, a system, or instructions stored on a computer-readable storage device. The details of particular implementations are set forth in the accompanying drawings and description below. Other features will be apparent from the following description, including the drawings, and the claims.

BRIEF DESCRIPTION OF THE DRAWINGS

FIGS. 2, 3, 4, 21-23, 25 and 27 are flowcharts of exemplary processes.
FIG. 6 illustrates exemplary design quality rules.
FIG. 7 illustrates exemplary design quality metrics.
FIGS. 8-20 are diagrams of exemplary user interfaces.

Like reference numbers represent corresponding parts throughout.

DETAILED DESCRIPTION

Figure 1:
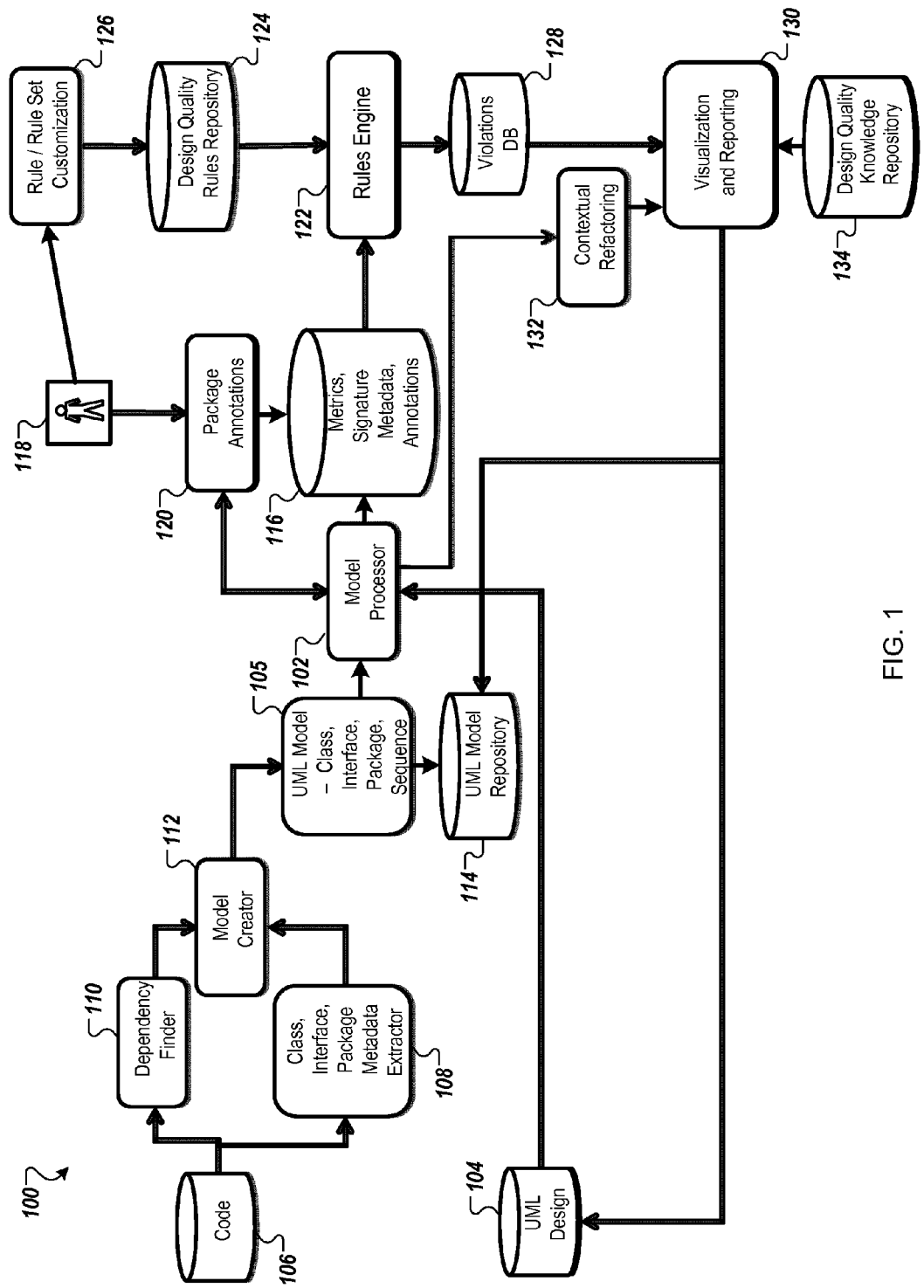
FIGS. 1, 22, and 31 are diagrams of exemplary systems.

FIG. 1 illustrates an example system 100 for evaluating and enforcing software design quality. A model processor 102 can evaluate a design of a software application. For example, the model processor 102 can evaluate a UML (Unified Modeling Language) design for a model accessed from a UML design repository 104. The UML model may be evaluated, for example, prior to development of code for an associated software application.

As another example, a reverse engineered model may be evaluated. For example, if a UML design for a model does not exist, a UML model 105 may be created from code in a code repository 106. For example, class, interface and package information may be extracted from the code using an extractor component 108 and dependencies between classes, packages, and other design elements may be identified using a dependency finder component 110. A model creator 112 may create the model 105, using the extracted class, interface, and package information and the identified dependencies. The recovered design may be stored in the UML design repository 104 or in a UML model repository 114.

The model processor 102 may process an original or reverse engineered design to produce model information such as, for example, metrics, signature metadata, and annotations, which may be stored in a model information repository 116. Furthermore, a user 118 may create one or more package annotations 120, which may also be stored in the model information repository 116. Package annotations may include, for example, comments about the design of classes, packages, and other software elements.

A rules engine 122 may access design quality rules from a rules repository 124. The rules repository 124 may include pre-defined rules and may also include rules customized by the user 118 using a rule/rule set customization component 126. Design quality rules may be defined to evaluate a quality of design of a software application.

The rules engine 122 may process the model information from model information repository 116, applying the rules retrieved from the rules repository 124 to the design to detect violations of the design quality rules. If violations of the rules are found, violations may be stored in a violations database 128. Violations may also be reported to the user 118 using a visualization and reporting component 130. The visualization and reporting component 130 may display refactoring suggestions to the user 118. Refactoring suggestions may be determined by a contextual refactoring component 132 which may provide suggestions based on information retrieved from a design quality knowledge repository 134.

The user 118 may provide user input to address one or more violations of the design quality rules. For example, the user 118 may provide input, using a modeling application, to update the design to correct one or more detected violations of the design quality rules. As another example, the user 118 may provide an input to ignore a detected violation, and may provide a rationale for why the violation can be ignored.

Figure 2:
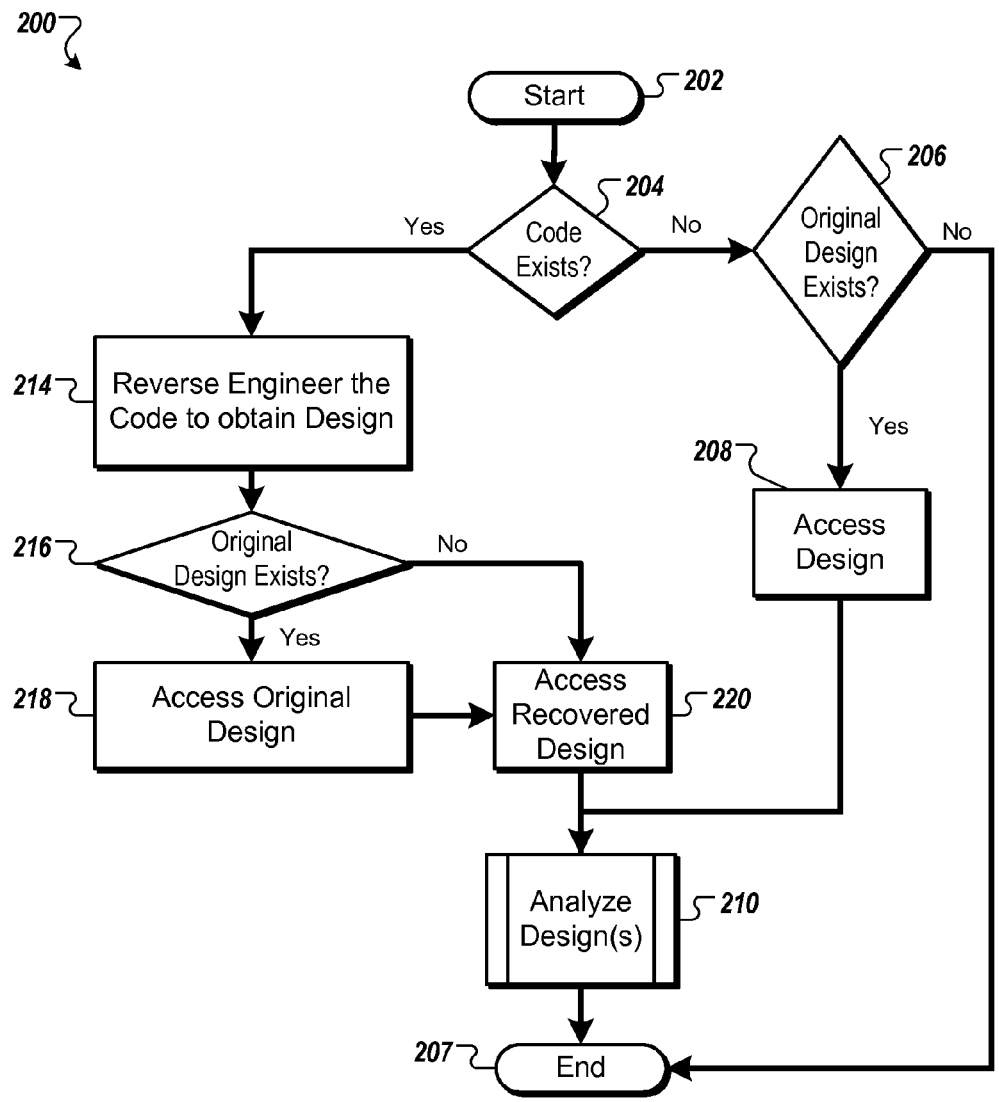

FIG. 2 illustrates a process 200 for analyzing a software design. The operations of the process 200 are described generally as being performed by the system 100. The operations of the process 200 may be performed by one of the components of the system 100 (e.g., the model processor 102) or may be performed by a combination of the components of the system 100. In some implementations, operations of the process 200 may be performed by one or more processors included in one or more electronic devices.

When the process 200 begins (202), the system 100 determines whether code exists for the model (204). For example, in reference to FIG. 1, the model processor 102 may determine whether code for the model exists in the code repository 106.

If code does not exist for the model, the system 100 determines whether an original design exists (206). For example, in reference to FIG. 1, the model processor 102 may determine whether an original design for the model exists in the UML design repository 104. The model processor 102 may determine that a partial design exists.

If an original design does not exist, the process 200 ends (207). If an original design (e.g., complete or partial) exists, the system 100 accesses the original design (208). For example, in reference to FIG. 1, the model processor 102 may access the design from the UML design repository 104.

The system 100 analyzes the accessed original design (210). For example, in reference to FIG. 1, the model processor 102 may process the UML model to produce model information such as, for example, metrics, signature metadata, and annotations, which may be stored in a model information repository 116. A rules engine 122 may access design quality rules from a rules repository 124. The rules repository 124 may include pre-defined rules and may also include rules customized by the user 118 using a rule/rule set customization component 126. The rules engine 122 may process the model information from the model information repository, applying the rules retrieved from the rules repository 124. If violations of the rules are found, violations may be stored in a violations database 128. Analyzing the design is described in more detail below with respect to FIG. 3.

If code is determined to exist (e.g., in step 204), the system 100 reverse engineers the code to obtain a recovered design (214). For example, in reference to FIG. 1, class, interface and package information may be extracted from code in a code repository 106 using an extractor component 108 and dependencies between classes, packages, and other design elements may be identified using a dependency finder component 110. A model creator 112 may create the model 105, using the extracted class, interface, and package information and the identified dependencies. The recovered design may be stored in the UML design repository 104 or in a UML model repository 114.

The system 100 determines whether an original design exists (216). For example, in reference to FIG. 1, the model processor 102 may determine whether an original design for the model exists in the UML repository 104. If an original design exists, the system 100 accesses the original design (218). For example, in reference to FIG. 1, the model processor 102 may access the design from the UML repository 104.

The system 100 accesses the recovered design regardless of whether or not an original design exists (220). For example, in reference to FIG. 1, the model processor 102 may access the recovered design from the UML model repository 114.

The system 100 analyzes the original and/or recovered design (210). If both a recovered design and an original design have been accessed, the model processor may compare the recovered design to the original design to see if the recovered design deviates from the original. The model processor may analyze the recovered design and/or the original design as described below with respect to FIG. 3.

Different approaches may be used to determine whether a recovered design deviates from an original design. For example, a UML diagram associated with the recovered design may be compared to a UML diagram associated with the original design. As another example, a violations report obtained from running design quality rules on the recovered design may be compared to a violations report obtained from running design quality rules on the original design. The number and type of violations associated with the recovered design may be compared to the number and type of violations of the original design. If more than a threshold number of differences are identified by such a comparison, it may be determined that the recovered design deviates from the original design.

As yet another example of identifying design deviation between an original design and a recovered design, structural metrics associated with the recovered design may be compared to structural metrics associated with the original design. Structural metrics may include, for example, the number of classes, packages, and interfaces included in a design, coupling between design entities, and metrics which indicate the amount and depth of inheritance used in the design. If the number and/or magnitude of differences in structural metrics between the recovered design and the original design exceeds a threshold, it may be determined that the recovered design deviates from the original design.

Figure 3:
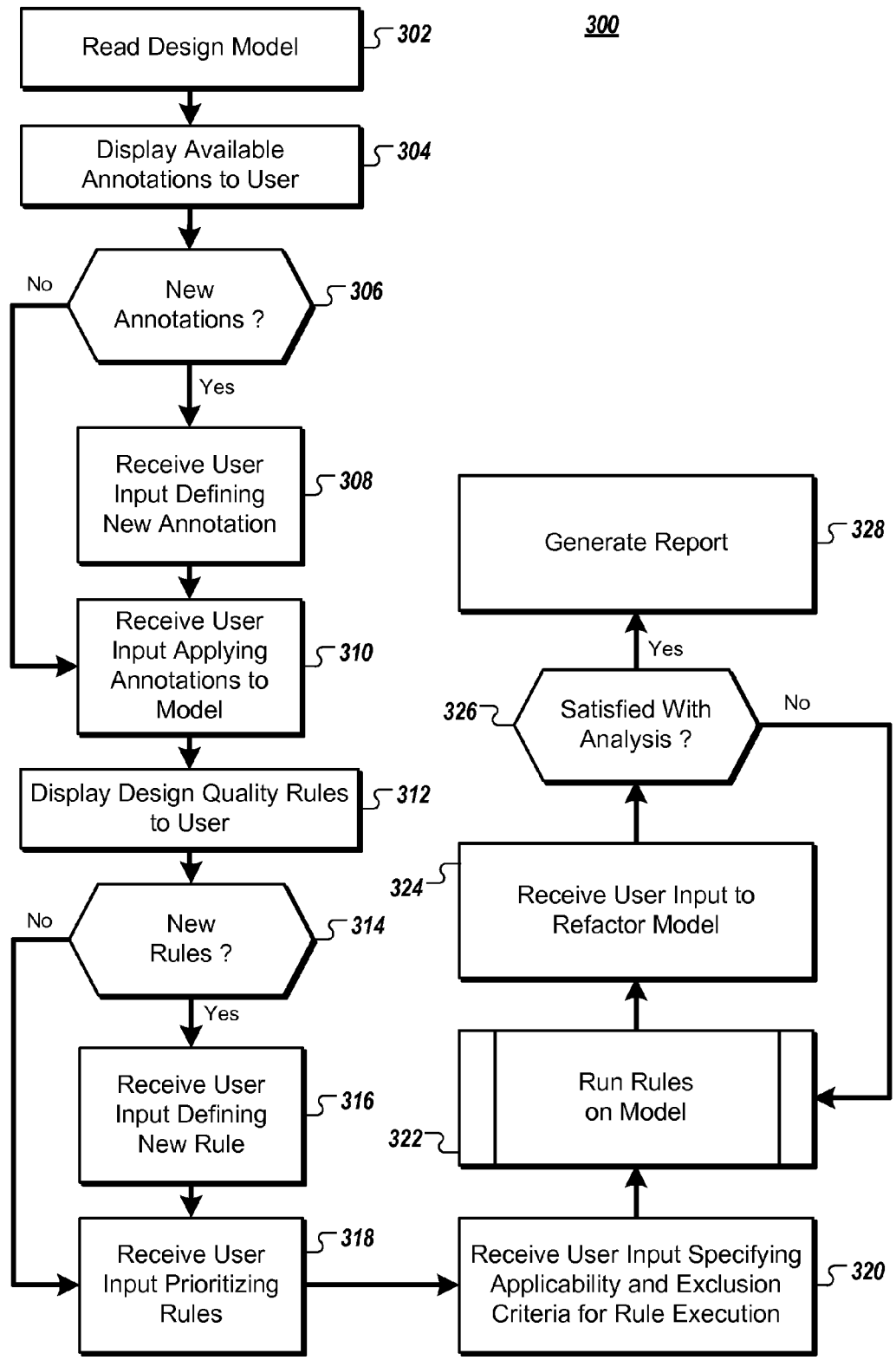

FIG. 3 illustrates a process 300 for analyzing a software design. The operations of the process 300 are described generally as being performed by the system 100. The operations of the process 300 may be performed by one of the components of the system 100 (e.g., the model processor 102) or may be performed by a combination of the components of the system 100. In some implementations, operations of the process 300 may be performed by one or more processors included in one or more electronic devices.

The system 100 reads a design model (302). For example and in reference to FIG. 1, the model processor 102 may access a design model from the UML design repository 104.

The system 100 displays available annotations to the user (304). For example, the design model may be displayed in a modeling application, and annotations included in the design may be displayed to the user in the modeling application.

The system 100 determines whether new annotations exist (306). For example, the system 100 can receive a user input from the user representing a request to add a new annotation to the design.

If new annotations exist, the system 100 receives user input defining one or more new annotations (308). For example, the user may provide details for the annotation (e.g., text comments).

The system 100 receives user input applying annotations to the model (310). For example, the user may identify one or more software elements (e.g., classes, packages) which are associated with one or more annotations.

The system 100 displays design quality rules to the user (312). For example, existing design quality rules may be displayed to the user in a user interface. The user interface may display the name of each rule, a scope, and an explanation. Design quality rules may be retrieved from a rule repository (e.g., repository 124, FIG. 1).

The system 100 determines whether there are new design quality rules (314). For example, the user may provide a user input indicating a request to add a new rule.

If there are new design quality rules, the system 100 receives user input defining one or more new rules (316). For example, the user may provide a name for the rule, a description, a scope applicability (e.g., package, class, sequence diagram, interface), and a condition defining the rule (e.g., a condition based on one or more attributes of a software element, such as number of operations of a class or interface, number of descendants, number of classes in a package, or any other attribute).

The system 100 receives user input prioritizing rules (318). For example, the user may use a user interface to arrange a list of rules in an order which represents the desired priority of rules (e.g., rules placed near the top of a priority list may have a higher priority than rules placed near the bottom of a priority list).

The system 100 receives user input specifying applicability and exclusion criteria for rule execution (320). For example, the user may specify one or more rules or one or more rule types to exclude from rule execution. As another example, the user may specify one or more design elements (e.g., class, package) to exclude from evaluation.

Figure 4:
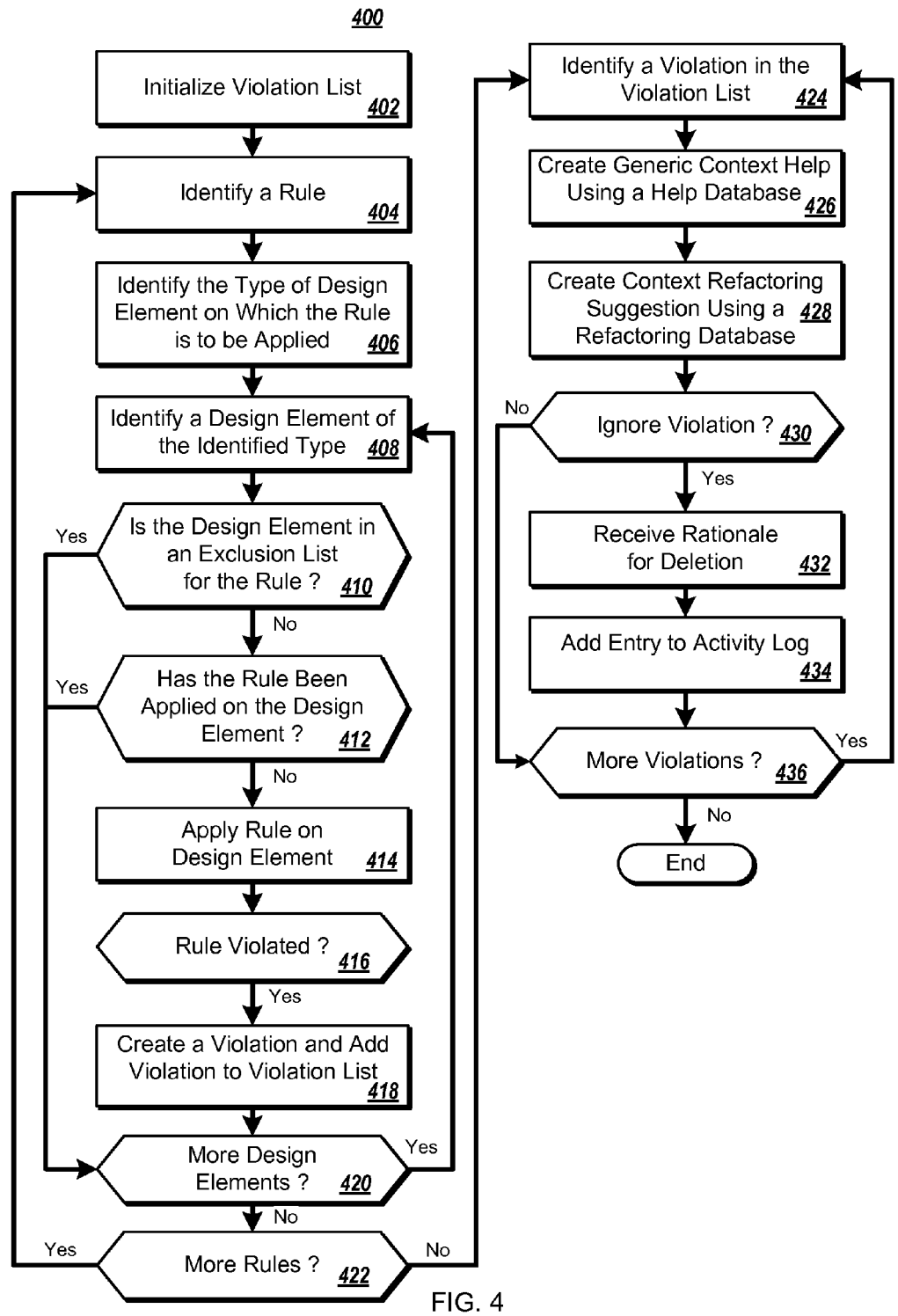

The system 100 runs the rules on the model (322). Running rules on the model is described in more detail below with respect to FIG. 4. FIG. 4 illustrates a process 400 for running rules on a software model. The operations of the process 400 are described generally as being performed by the system 100. The operations of the process 400 may be performed by one of the components of the system 100 (e.g., the model processor 102) or may be performed by a combination of the components of the system 100. In some implementations, operations of the process 400 may be performed by one or more processors included in one or more electronic devices.

The system 100 initializes a violation list (402). For example, a violations list may be represented as one or more data structures or software objects or as one or more data elements in a database system.

The system 100 identifies a rule (404). For example, a rule may be identified from a list of rules retrieved from a rules repository (e.g., the design quality rules repository 124 described above with respect to FIG. 1).

The system 100 identifies the type of design element on which the rule is to be applied (406). For example, a rule may be applicable to a design element such as a class, an interface, a package, or a sequence diagram.

The system 100 identifies a design element of the identified type (408). For example, if the design element type is a class, the system 100 identifies a class included in a software design.

The system 100 determines whether the design element is in an exclusion list for the rule (410). For example, a user-specified exclusion list may exist, and user-specified design elements may be included in the exclusion list to be excluded when design quality rules are applied. If the design element is in an exclusion list, the rule is not applied to the design element.

If the design element is not in an exclusion list for the rule, the system 100 determines whether the rule has been applied on the design element (412) and, if the rule has not been applied on the design element, the system 100 applies the rule on the design element (414). For some rules, one or more metrics associated with the rule (e.g., number of operations, number of ancestors) may be determined for the design element. If the rule has been applied on the design element, the system 100 does not apply the rule to the design element again.

The system 100 determines whether the rule is violated (416). For example, one or more metrics for the design element may be compared to a threshold. For example, a "godly interface" rule (e.g., rule 614, FIG. 6) may be violated if the number of operations defined by an interface exceeds a threshold of twenty. As another example, an excessive remoting rule (e.g., rule 628, FIG. 6) may be violated if the number of remote calls in a sequence diagram exceeds a threshold of three.

For some rules, the rule may be violated if the design element has a particular feature. For example, a private constructor found in class rule (e.g., rule 612, FIG. 6) may be violated if a class includes a private constructor. As another example, a non-API (Application Programming Interface) method access rule (e.g., rule 610, FIG. 6) may be violated if a class has public methods which are not accessed outside of the package of the class. As yet another example, a design-to-contract rule (e.g., rule 620, FIG. 6) may be violated if a package has only concrete classes and no interfaces.

If the rule is violated, the system 100 creates a violation and adds the violation to the violation list (418). For example, a violation added to the violation list may include information on the rule type, a rule priority, non-functional attributes impacted by the rule violation, and an identifier of the design element(s) which caused the rule violation.

The system 100 determines whether more design elements exist (420). For example, if the design element type associated with the rule is class, the system 100 determines whether there are other classes included in the design model for which the rule has not been applied.

If more design elements exist, the system 100 identifies a next design element of the identified type (408) and repeats application of the rule to the next design element. For example, if the design element type is a class, the system 100 identifies a class included in the design model for which the rule has not been applied and applies the rule to the identified class.

If more design elements do not exist, the system 100 determines whether more rules exist (422). For example, the system 100 may determine whether all rules retrieved from a rules repository have been applied to the design. If more rules exist, the system 100 repeats steps 404 to 420 using the identified rule. If no more rules exist, the system 100 identifies a violation in the violation list (424). For example, an iterator object may be used to iterate over a collection of violation objects in a violation list. As another example, a database cursor may be used to iterate over violation database records retrieved from a database.

The system 100 creates generic context help using a help database (426). For example, help information related to a detected violation of the accessed design quality rules may be accessed from a help database (e.g., the design quality knowledge repository 134 described above with respect to FIG. 1). A context specific help message for the detected violation of the accessed design quality rules may be generated based on the accessed help information and the help message may be displayed to the user.

The system 100 creates one or more context refactoring suggestions using a refactoring database (428). For example, refactoring information related to a detected violation of the accessed design quality rules may be accessed from a database (e.g., the design quality knowledge repository 134 described above with respect to FIG. 1). A context specific refactoring suggestion for the detected violation of the accessed design quality rules may be generated based on the accessed refactoring information. The generated context specific refactoring suggestion may describe a suggestion for correcting the detected violation of the accessed design quality rules. The refactoring suggestion may be displayed to the user.

The system 100 determines whether to ignore the violation (430). For example, the system 100 may determine to ignore the violation if the user indicates that they wish to ignore the violation or if the violation is of a violation type included in a user exclusion list.

If the violation is to be ignored, the system 100 receives rationale for deletion of the violation (432). For example, a user may provide a rationale for ignoring when the user specifies that they wish to ignore the violation. The system 100 may require the user to provide rationale to ignore a violation, so that the rationale is captured and can be reviewed at a later date.

The system 100 adds an entry to an activity log (434). For example, an entry may be added to an activity log to indicate that the detected violation has been ignored and the rationale for ignoring the detected violation.

The system 100 determines whether more violations exist (436). For example, the system 100 may determine whether there are unprocessed violations in a violations list. If more violations exist, the system 100 identifies a next violation in the violation list (424) and repeats the steps 426 to 434 for the identified violation.

Returning to FIG. 3, the system 100 receives user input to refactor the model (324). For example, a user input may be received to address one or more violations of the accessed design quality rules by updating the design.

The system 100 determines whether the user is satisfied with the analysis (326). For example, a design reviewer can indicate whether the design is acceptable. If the user is satisfied with the analysis, the system 100 generates a report (328). For example, a design review questions report may be generated. As another example, an unresolved violations report may be generated, such as input for a review. If the user is not satisfied with the analysis, the system 100 reruns the rules on the model (322), possibly after the model is refactored.

Figure 5:
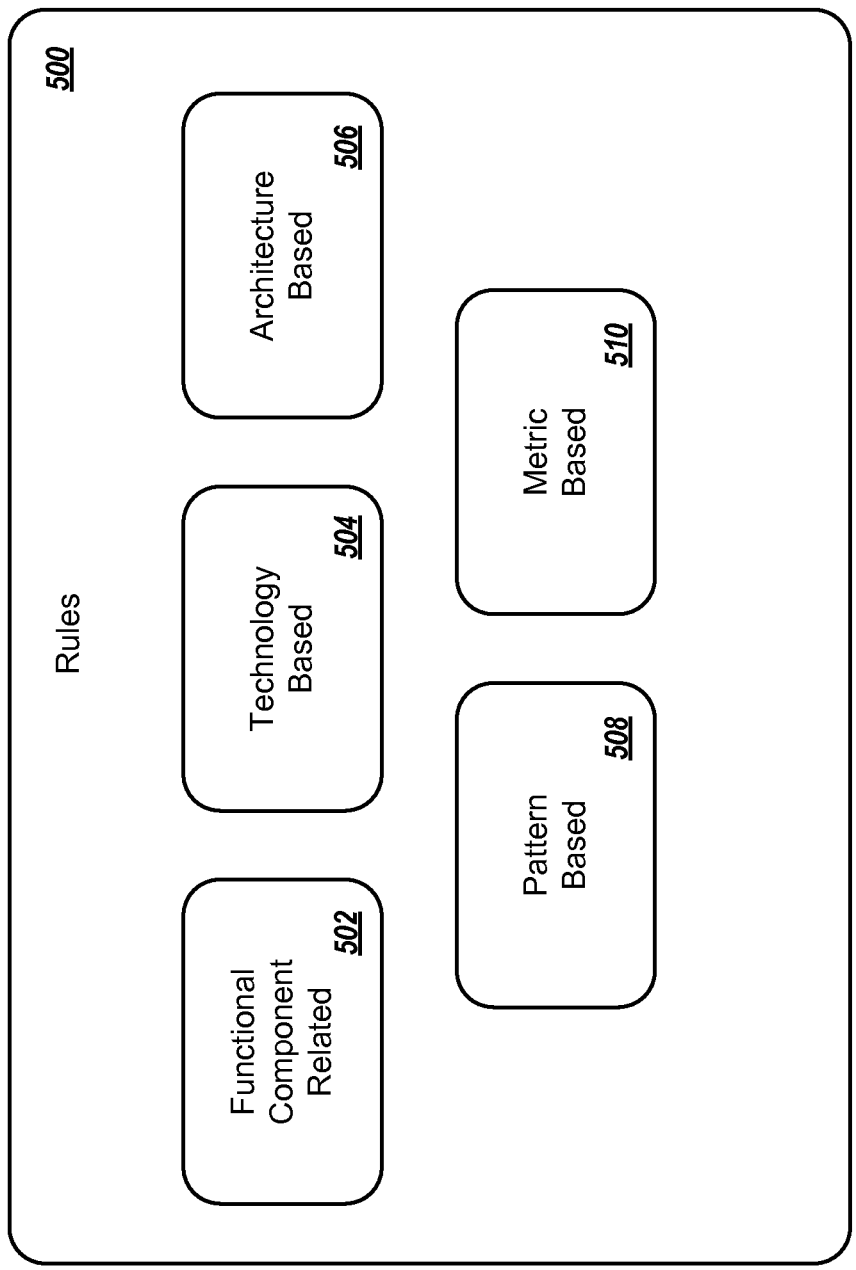
FIG. 5 illustrates exemplary design quality rule categories.

FIG. 5 illustrates example rule categories 500. Rules may include, for example, functional component-related rules 502, technology-based rules 504, architecture-based rules 506, pattern-based rules 508, and metric-based rules 510. Functional component-related rules 502 may, for example, be project-specific rather than generic. For instance, a functional component rule for a specific project may state that an order management component should not interact with a payroll component. Functional component-related rules 502 may include user-specified rules, such as, for example, rules defined using a rule customization framework or a design annotation framework.

Technology-based rules 504 may include rules pertaining to best practices in using specific technologies or specific frameworks, such as a particular web technology or e-commerce technology framework. As another example, technology-based rules 504 may include rules which can be related to improving performance in a particular environment. For example, a technology-based rule for a networked environment may be based on limiting remote calls between system components.

Metric-based rules 510 may include rules which are primarily or solely based on metrics derived from software code or a software design model (e.g., UML model). A metric-based rule may be used to assess structural quality of a design. A rule may be based on one or more composite metrics (e.g., a metric based on one or more other metrics). One or more composite metrics may be used as a basis for obtaining goals such as component testability. For example, a testability rule may be based on one or more metrics which indicate the number of public operations in a class or package. A metric-based rule may be based on custom thresholds. For instance, in some environments, a threshold for a maximum recommended depth of an inheritance tree may be two and, in other environments, a maximum recommended depth of an inheritance tree may be three.

Pattern-based rules 508 may be based on higher levels of abstraction than metric-based rules 510. Pattern based rules 508 may include, for example, rules based on "Gang of Four" patterns (e.g., design patterns described in a seminal "Design Patterns: Elements of Reusable Object-Oriented Software" book written by Gamma, Helm, Johnson, and Vlissides), or other patterns suggested in other literature, or on custom patterns specified by the user. Patterns may be identified, for example, by analyzing dependencies between design elements or by analyzing signatures of design elements. Example pattern-based rules 508 include design-to-contract and program-to-interface patterns (described in more detail below).

Architecture-based rules 506 may include rules which have a greater abstraction than pattern-based rules 508. For example, architecture-based rules 506 may be based on the structure of architecture components and the relationship between architecture components. Architecture-based rules 506 may include rules based on pre-defined structure and relationship guidelines and rules based on organization-specified or user-specified guidelines. Architecture-based rules 506 may be templatized and may be based on other structural and relationship-based rules included in a rule knowledge base.

FIG. 6 illustrates a table 600 of example rules 602-630. The table 600 includes a scope column 601 which indicates the scope of applicability, such as class, interface, package, or sequence diagram, of each example rule 602-630. The rules 602-630 and other rules, such as custom rules defined by a user, may be used, for example, by the rules engine 122 (FIG. 1). An excessive fan-in metric rule 602 may be violated, for example, if an excessive number of classes (e.g., as compared to a threshold) depend on a particular class. An excessive inheritance rule 604 may be violated, for example, if excessive inheritance (e.g., as compared to a threshold) is used for a class. A class with high levels of inheritance may, for example, become a bottleneck in extensibility and changes to such a class can impact children of the class. A "godly class" rule 606 may be violated, for example, if a class has a very large amount of behavior (e.g., as compared to a threshold). A class (e.g., functional class) with a large amount of behavior may be considered for refactoring.

A high-coupling, high-inheritance, and high dependency out rule 608 may be violated, for example, if a class has many inbound dependencies and a high level of inheritance (e.g., as compared to a threshold). Such a class may represent a "brittle" class and, if such a class fails (e.g., in testing), dependent classes may be affected. A non API method access rule 610 may be violated, for example, if a class has public methods but the class is not accessed by other classes outside of the package of the class. Ideally, a class has public methods only if the particular functionality exposed by the public methods is accessed by other classes (especially classes from outside the class's package). If a class has public methods which are not accessed by classes in other packages, the exposure of the public methods in a class may eventually lead to erroneous usage of functionality and break the API of the system.

A private constructor found in class rule 612 may be violated, for example, if a private constructor is found inside of a class definition. Private constructors may be used for preventing class instantiation. Private constructors are, however, not the default for some languages. Therefore, private constructors may be marked for further evaluation. A "godly interface" rule 614 may be violated, for example, if an interface has a large amount of behavior (e.g., as compared to a threshold). An interface with a large amount of behavior may be considered for refactoring. Since each client of an interface depends on the exposed class interface, there is an inadvertent coupling between each of the clients of a class. If one client needs additional functionality added to the single class interface, when this functionality is added to the interface, every other client may need to change to support the added functionality even though many of the classes may not need the functionality. Therefore, one change of one client class may force a change to propagate throughout the system to many client classes, which can result in time consuming code maintenance and hard to locate software bugs.

A PIF (Program to Interface Factor) rule 616 may be violated, for example, if a package is coupled to the rest of the system through concrete classes, rather than through interfaces. Ideally, a package is coupled only through interfaces. Using concrete classes, rather than interfaces, may lead to low-extensibility packages. A "godly package" rule 618 may be violated, for example, if a package includes more than a threshold number of classes and/or interfaces. A package with a relatively high number of classes and/or interfaces may include too much functionality and, as such, may be a candidate for refactoring.

A design to contract rule 620 may be violated, for example, if a class-to-interface ratio for a package is either too high or too low (e.g., as compared to a threshold). For example, a package that has only classes may be absolutely concrete and may not be extensible. However, a package that has only interfaces may be absolutely abstract and may be deemed to be incorrectly labeled if it is not labeled as a framework package. A dependency inversion rule 622 may be violated, for example, if a low-level module depends on a high-level module. Ideally, high-level modules do not depend upon low-level modules and both high-level modules and low-level modules depend only upon abstractions. An omni-present package rule 624 may be violated, for example, if a package with coupling links to a large number of packages in the system (e.g., as compared to a threshold). Typically an omni-present package is a package including utility classes or core components of a system. If there are too many omni-present packages, refactoring the system may be considered.

An open-close rule 626 may be violated, for example, if a software entity is not open for extension and closed for modification. In general, an open-close principle can be applied to classes, modules, or functions. Being open for extension but closed for modification may prevent a change from being detrimental to the system. An excessive remoting rule 628 may be violated if a sequence diagram includes a high number of remote calls (e.g., as compared to a threshold). A high number of remote calls may impact performance. A factory rule 630 may be violated, for example, if a class has multiple constructors. Having multiple constructors for a class may make it hard to decide which constructor to call during development. It may be useful to have all classes in a class hierarchy have nonpublic constructors and to create a factory class which clients can use to directly instantiate classes that reside in one package and implement a common interface.

Other rules may be violated. For example, an excessive coupling rule may be violated if there is excessive coupling between classes. A lack of stable abstraction rule may be violated if the abstraction of a package is not in proportion to its stability (e.g., if stable packages are not abstract or instable packages are not concrete). A stable dependency rule may be violated if a package depends on another, less-stable package. A "feature-envy" rule may be violated if a method refers to data of other classes more than data of its own class. A "long-method" rule may be violated if a method includes more than a threshold number of lines of code (long methods may be hard to understand, debug, and reuse). A data-class rule may be violated (triggering further inquiry) if a class has more than a threshold number of public accessor methods.

FIG. 7 illustrates a table 700 of example metrics 702-744. The table 700 includes a scope column 701 which indicates the scope of applicability, such as class, interface, package, or sequence diagram, of each example metric 702-744. The metrics 702-744 may be used, for example, with one or more metric-based rules 510 (FIG. 5).

A NOC (Number of Children) metric 702 indicates the number of children (e.g., UML generalization) of a class. An "OpsInh" (Operations Inherited) metric 704 indicates the number of inherited operations of a class while an "AttrInh" (Attributes Inherited) metric 706 indicates the number of inherited attributes of a class. A "DIT" (Depth of Inheritance Tree) metric 708 indicates the depth of a class in an inheritance hierarchy and may indicate the longest path from the class to the root of an inheritance tree.

A "NumDesc" (Number of Descendants) metric 710 indicates the number of descendants of a class (e.g., the number of children of a class, the number of children of the class's children, etc.). A "NumAnc" (Number of Ancestors) metric 712 indicates the number of ancestors of a class. A "Dep_In" (Dependency Indicator) metric 714 indicates the number of elements which depend on a class, and may include incoming UML dependencies (e.g., dotted arrows on a UML diagram), method call or parameter type dependencies.

A "NumAssEl" (Number of Associated Elements) metric 716 indicates the number of associated elements in a same scope (e.g., namespace, package) as a class. Associations to elements in a same scope are encouraged, because they do not cross a scope boundary and contribute to cohesion within a package or namespace. Associations may include aggregations, compositions, and UML associations and may include incoming, outgoing and bidirectional associations.

A "NumOps" (Number of Operations) metric 718 indicates the number of operations in a class. For example, all operations that are explicitly modeled (e.g., overriding operations, constructors, destructors), regardless of their visibility, owner scope and abstractness, may be included. However, inherited operations might not be included.

A "getters" metric 720 indicates the number of operations of a class which have a name starting with "get", "is", or "has". A "setters" metric 722 indicates the number of operations of a class which have a name starting with "set". A connectors metric 724 indicates the number of connectors owned by a class.

A "NumOps" (Number of Operations) metric 726 is similar to the NumOps metric 718, but indicates the number of operations for an interface rather than for a class. An "Assoc" (Associations) metric 728 indicates the number of elements an interface is associated with. A "NumAnc" (Number of Ancestors) metric 730 is similar to the NumAnc metric 712 but indicates the number of ancestors of an interface rather than a class. A "NumIndClients" (Number of Indirect Clients) metric 732 indicates the number of elements which implement a descendent of an interface while a "NumDirClients" (Number of Direct Clients) metric 734 indicates the number of elements directly implementing the interface.

A "NumOpsCls" (Number of Operations—Class) metric 736 indicates the number of operations in the classes of a package while a "NumClsRec" (Number of Classes—Recursive) metric 738 indicates the number of classes in a package and subpackages of the package. A nesting metric 740 indicates a nesting level of a package within a package hierarchy. A NumCls metric 742 indicates the number of classes in a package and a "NumInterf" (Number of Interfaces) metric 744 indicates the number of interfaces in a package.

Figure 8:
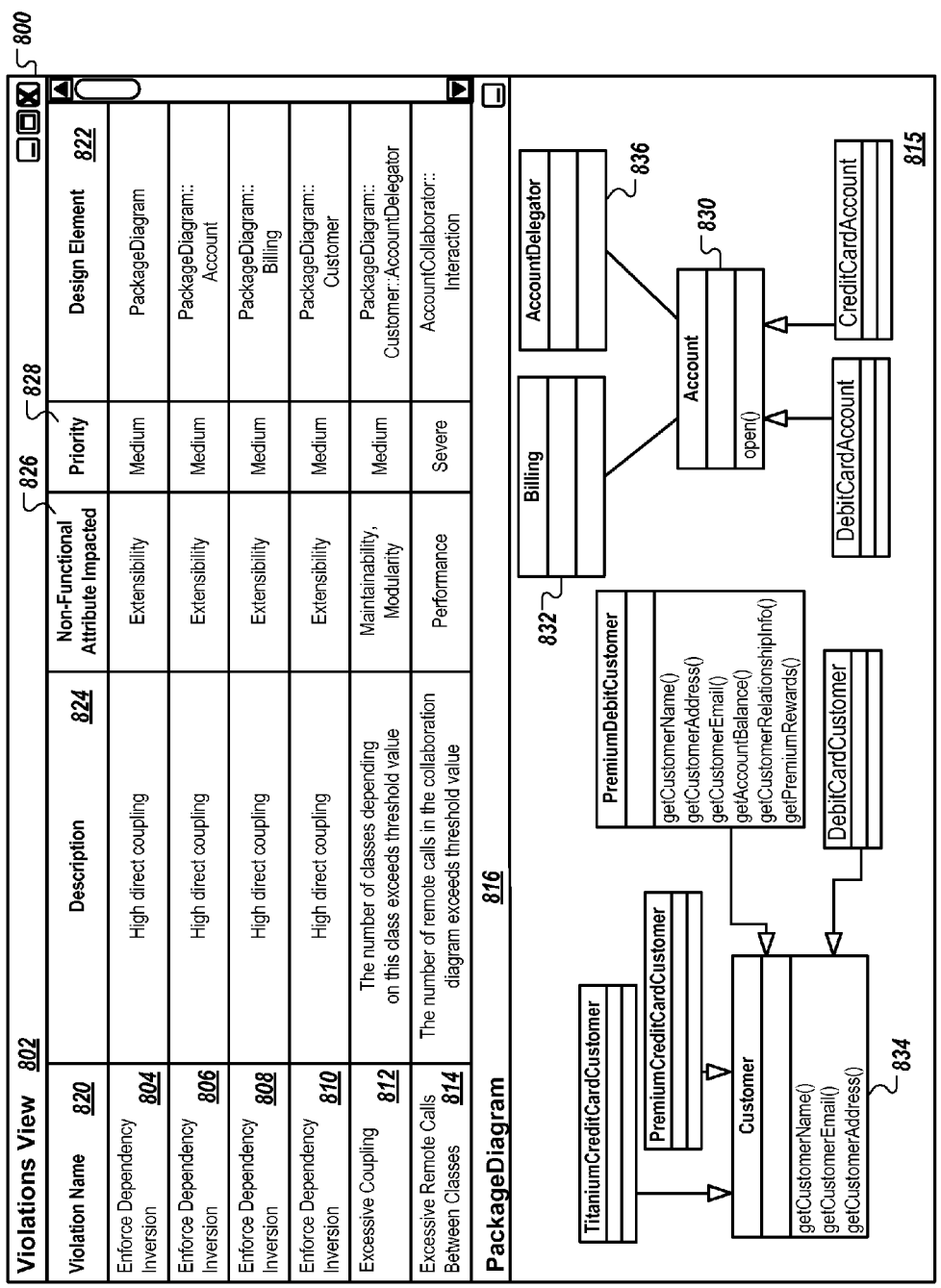

FIGS. 8 to 20 illustrate example user interfaces 800 to 2000, respectively, which illustrate aspects of an iterative process of running design quality rules on a software design. For example, FIG. 8 illustrates an example user interface 800. The user interface 800 includes a violations view 802 which is displaying example violations 804-814. The violations view 802 may list zero or more violations found when applying design quality rules to a software design and may display various information for each violation shown. The violations 804-814 may be applicable to software design elements included in a model 815 displayed in a model view 816. For example, as indicated in columns 820 and 822, respectively, violation 804 is an "enforce-dependency-inversion" violation applicable to a PackageDiagram package (e.g., the contents of the PackageDiagram package may be displayed in the model view 816). As shown in columns 824, 826, and 828, respectively, the violation 804 is related to "high direct coupling," impacts a non-functional extensibility attribute, and is of a medium priority.

Violations 806, 808, and 810, each also are "enforce dependency inversion" violations, which are applicable to classes 830, 832, and 834, respectively. Violation 812 is an excessive coupling violation applicable to the class 836, affects non-functional maintainability and modularity attributes, and is of medium priority. Violation 814 is an "excessive remote calls between classes" violation and is applicable to an Account-Collaboration interaction sequence diagram (not shown). The violation 814 affects performance and is a severe priority violation.

Figure 9:
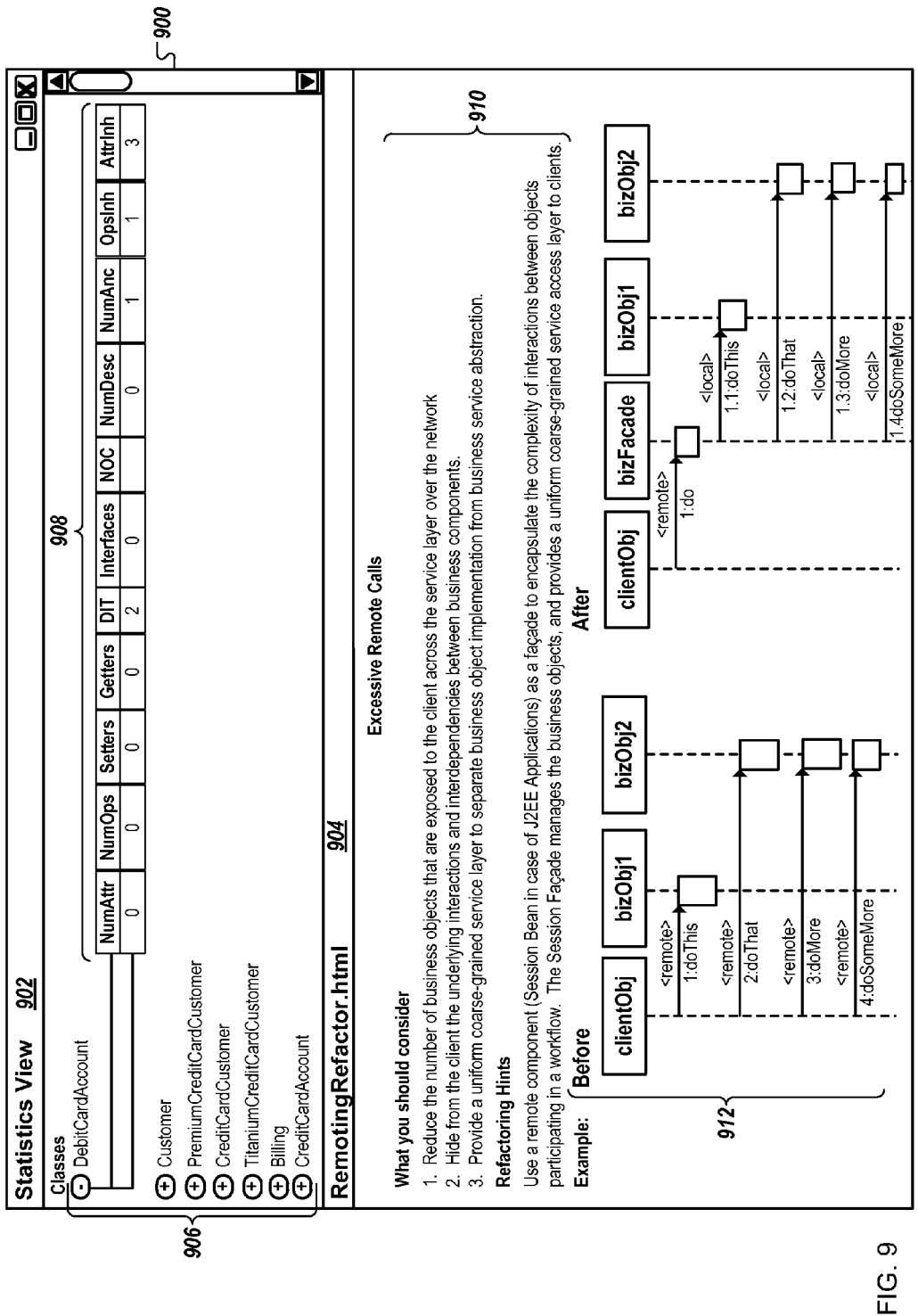

FIG. 9 illustrates a user interface 900 which includes a statistics view 902 and a refactoring suggestions view 904. A user may expand one or more design element representations using a tree control 906 to display an associated set of metrics 908. The metrics 908 include information for a "DebitCardAccount" class. For example, the metrics 908 indicate, among other statistics, that the DebitCardAccount class is at a second level depth in an inheritance tree and has one ancestor, one inherited operation, and three inherited attributes.

The refactoring suggestions view 904 may be shown, for example, if a user indicates that they wish to see refactoring suggestions for a violation (e.g., for one of the violations 804-814 described above with respect to FIG. 8). For example, details 910 about an excessive-remote-calls violation include considerations for the designer, and refactoring hints. The refactoring suggestions view 904 may also include one or more refactoring examples, such as, for example, "before and after" sequence diagram examples shown in an example 912.

Figure 10:
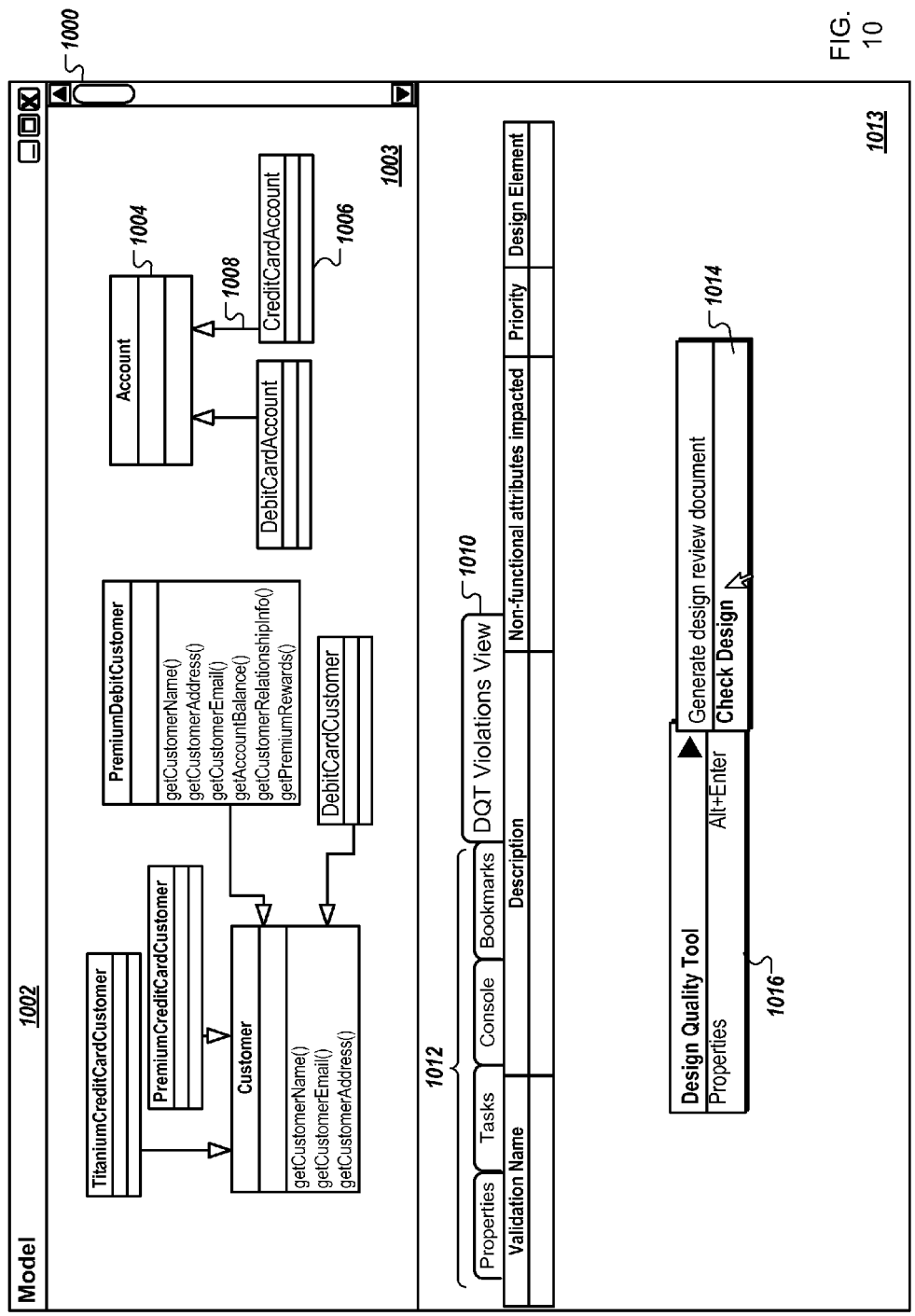

FIG. 10 illustrates a user interface 1000 for modeling software. The user interface 1000 may be used, for example, to model a software design using UML design elements (e.g., classes, interfaces, packages, and various types of diagrams). For example, the user interface 1000 includes a model view 1002 which illustrates a UML static structure model 1003. For example, the model view 1002 illustrates classes, such as classes 1004 and 1006, and relationships between classes, such as a generalization relationship 1008 between the class 1004 and the class 1006.

A design violations view may be integrated with the user interface 1000. For example, a violations view tab 1010 may be selected among other tabs 1012 of a modeling application to display a violations view 1013. The violations view 1013 may be similar to the violations view 802 described above with respect to FIG. 8 and may be used to show violations found after running design quality rules on the model 1003. For example, the user may run design quality rules on the model 1003 by selecting a "check design" menu item 1014 from a menu 1016 (the user may initiate the running of design quality rules in other ways, such as by using a hotkey sequence, a toolbar button, a command button, a pull-down menu, or by some other user input action). Also, design quality rules may be run on a design using batch or other background processes which do not require user input.

Figure 11:
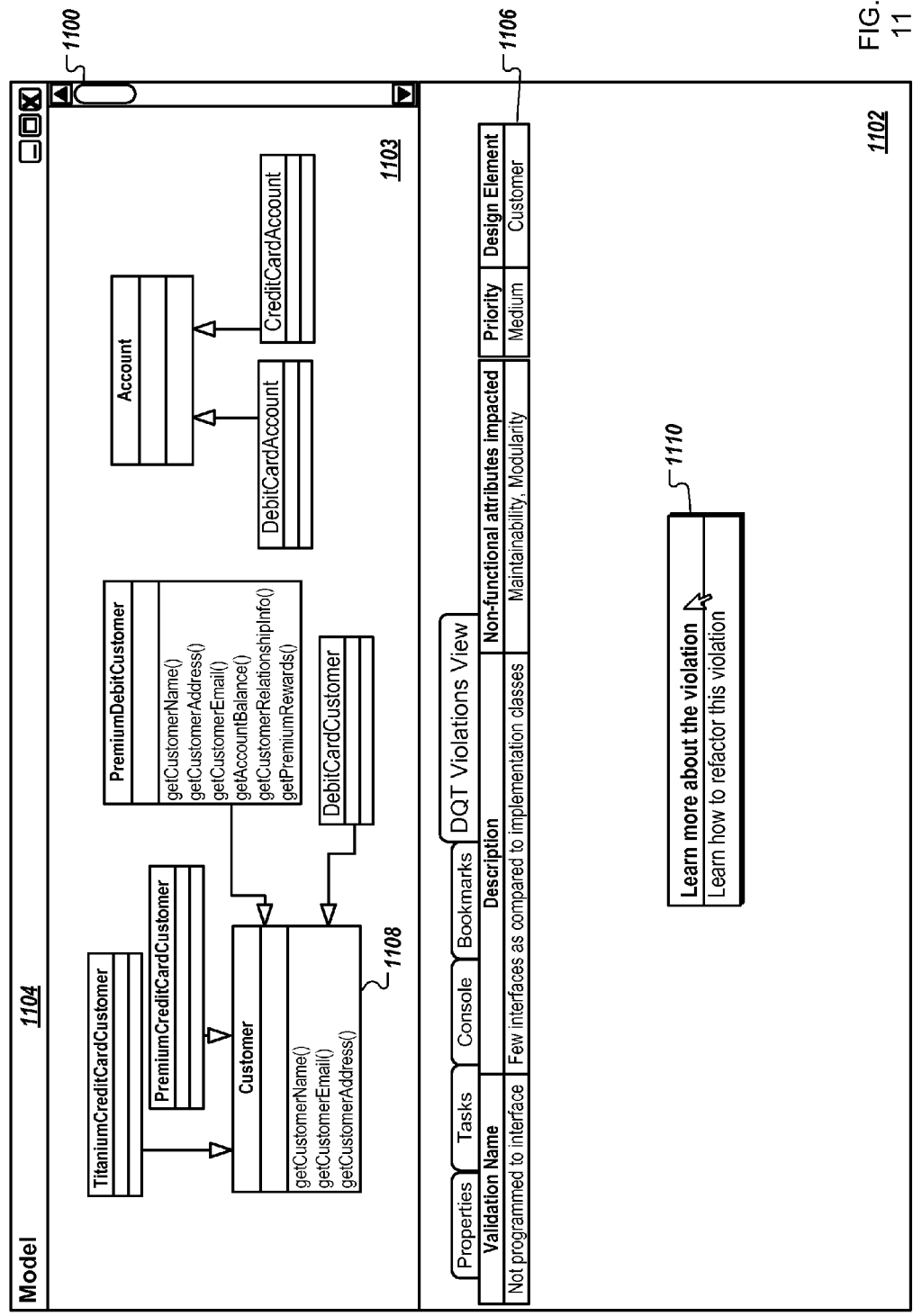

FIG. 11 illustrates a user interface 1100 which includes a violations view 1102 which displays violations found after running design quality rules on a model 1103 displayed in a model view 1104. The violations view 1102 includes a not-programmed-to-interface violation 1106 applicable to a class 1108. The violation 1106 indicates, for example, that the class 1108 has few interfaces as compared to implementation classes. The violation view 1102 indicates that the violation 1106 is a medium priority violation which may affect maintainability and modularity non-functional attributes. The user may learn more about the violation 1106 by, for example, selecting the violation 1106 and selecting a control such as a menu control 1110.

Figure 12:
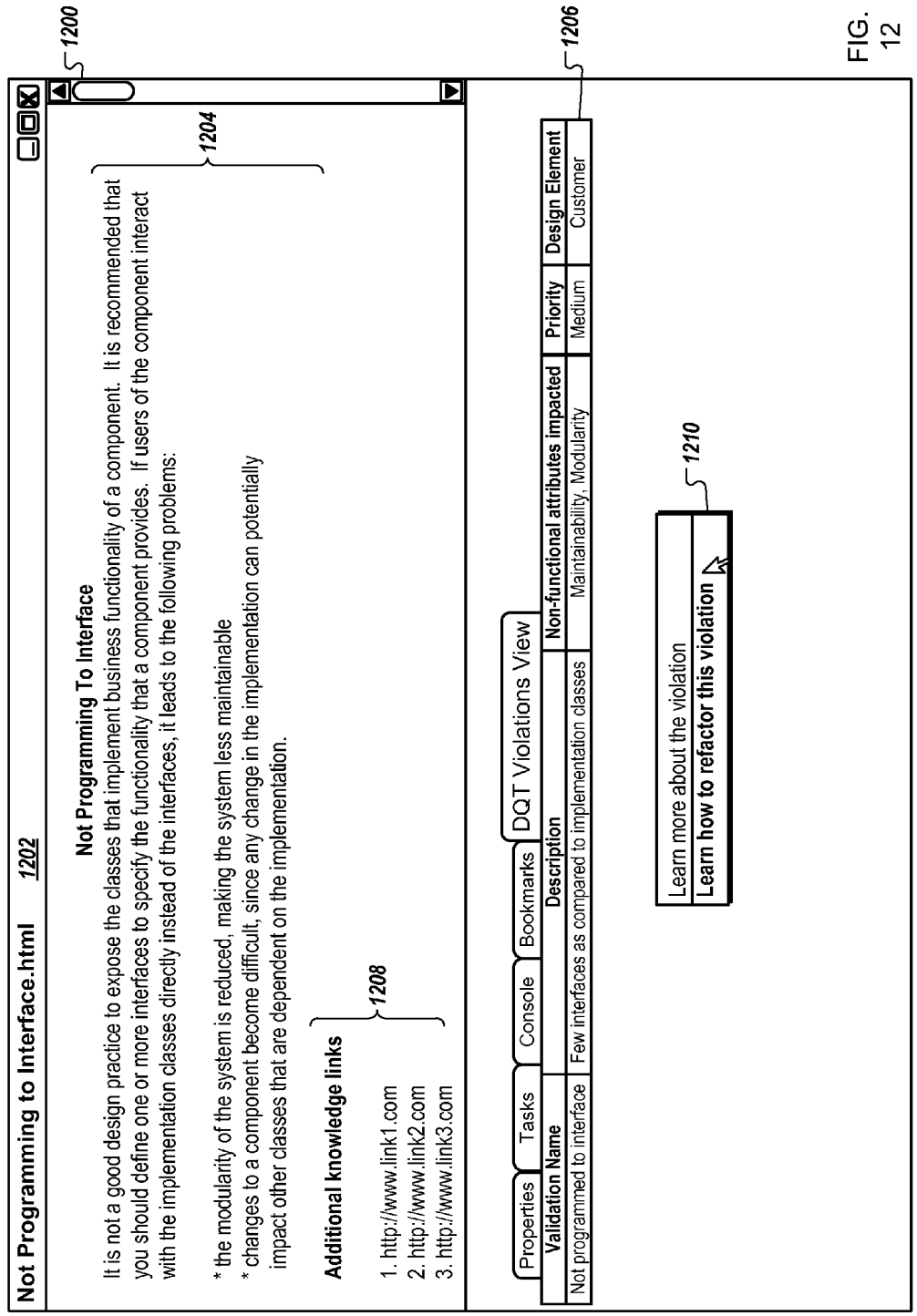

In response to the selection of the menu control 1110, a user interface such as the user interface 1200 illustrated in FIG. 12 may be displayed. The user interface 1200 includes a help view 1202 which includes a help description 1204 related to the not-programming-to-interface violation 1206. The help view 1202 may include one or more links 1208 to external resources (e.g., external web sites) which may include further information about the violation 1206. The user may view refactoring suggestions related to the violation 1206 by, for example, selecting the violation 1206 and selecting a control such as a menu control 1210.

Figure 13:
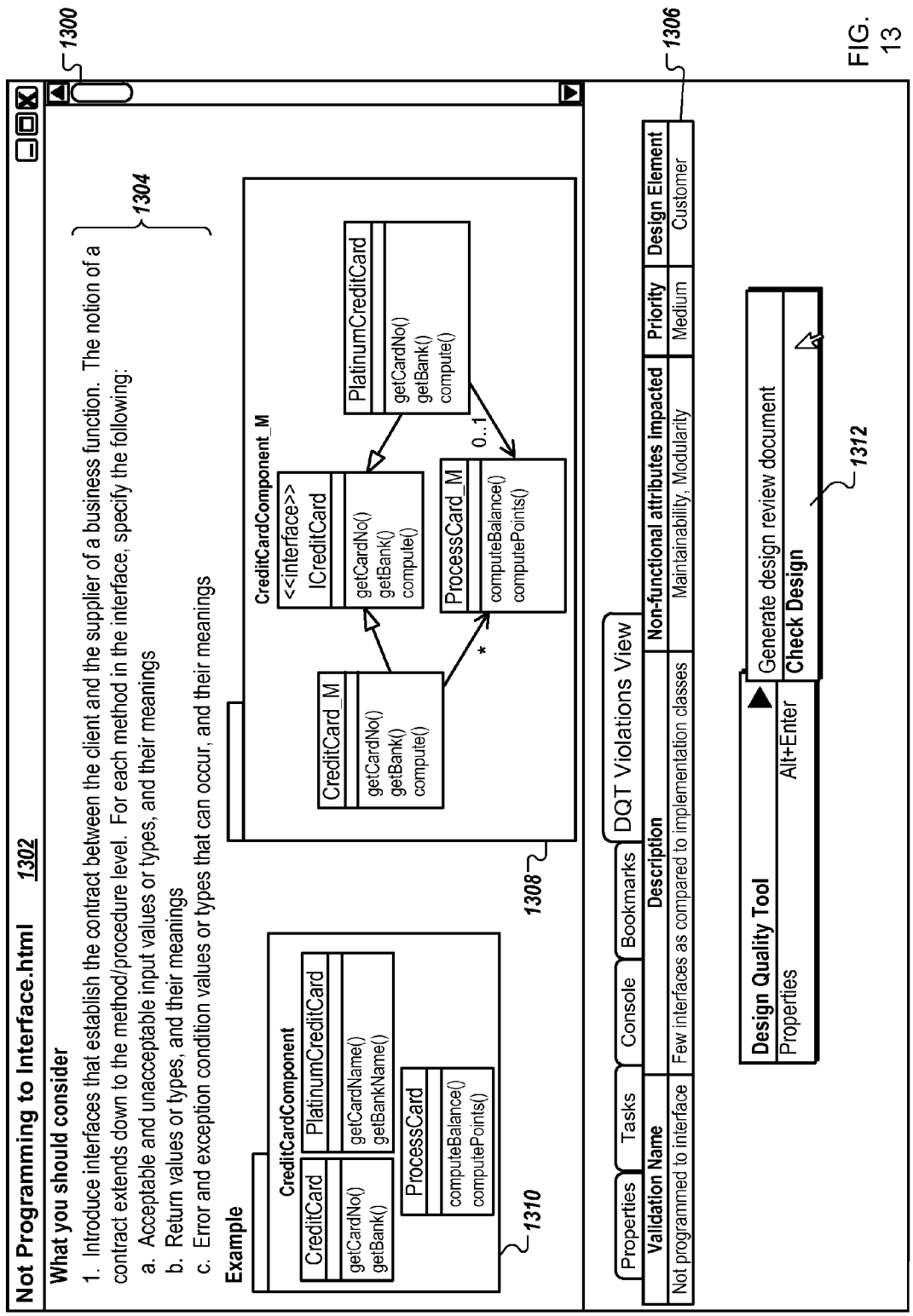

In response to the selection of the menu control 1210, a user interface such as the user interface 1300 illustrated in FIG. 13 may be displayed. The user interface 1300 includes a refactoring suggestion view 1302 which includes a refactoring discussion 1304 and an example which includes a refactored component 1308, which is a refactored version of component 1310 to correct the violation of not-programmed-to-interface. The user may use the refactoring suggestion to resolve the not-programmed-to-interface violation 1306. After refactoring, the user may re-run the design quality rules on the design, such as by selecting a menu control 1312.

Figure 14:
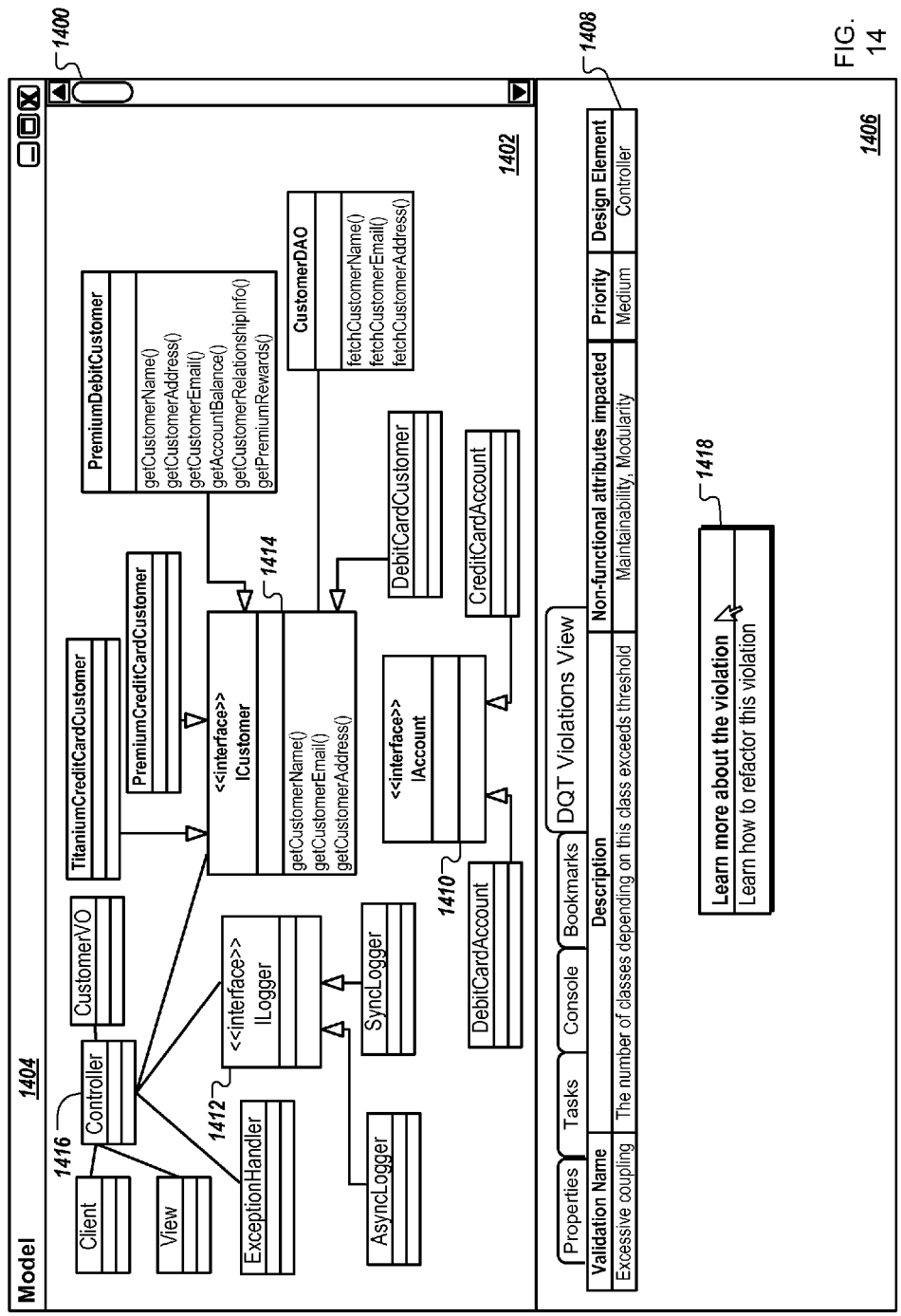

FIG. 14 illustrates a user interface 1400 that shows a refactored model 1402 in a model view 1404 and a violations view 1406, which includes a new excessive coupling violation 1408 found after running design quality rules on the refactored model 1402. The refactored model 1402 includes interfaces 1410, 1412, and 1414 representing account, logger, and customer concepts, respectively, which were introduced to resolve the previously discussed not-programmed-to-interface violation. The excessive coupling violation 1408 applies to a controller class 1416 and results from the number of classes depending on the class 1416 exceeding a threshold. The violation 1408 is a medium priority violation which may affect maintainability and modularity non-functional attributes. The user may learn more about the violation 1408 by, for example, selecting the violation 1408 and selecting a control such as a menu control 1418.

Figure 15:
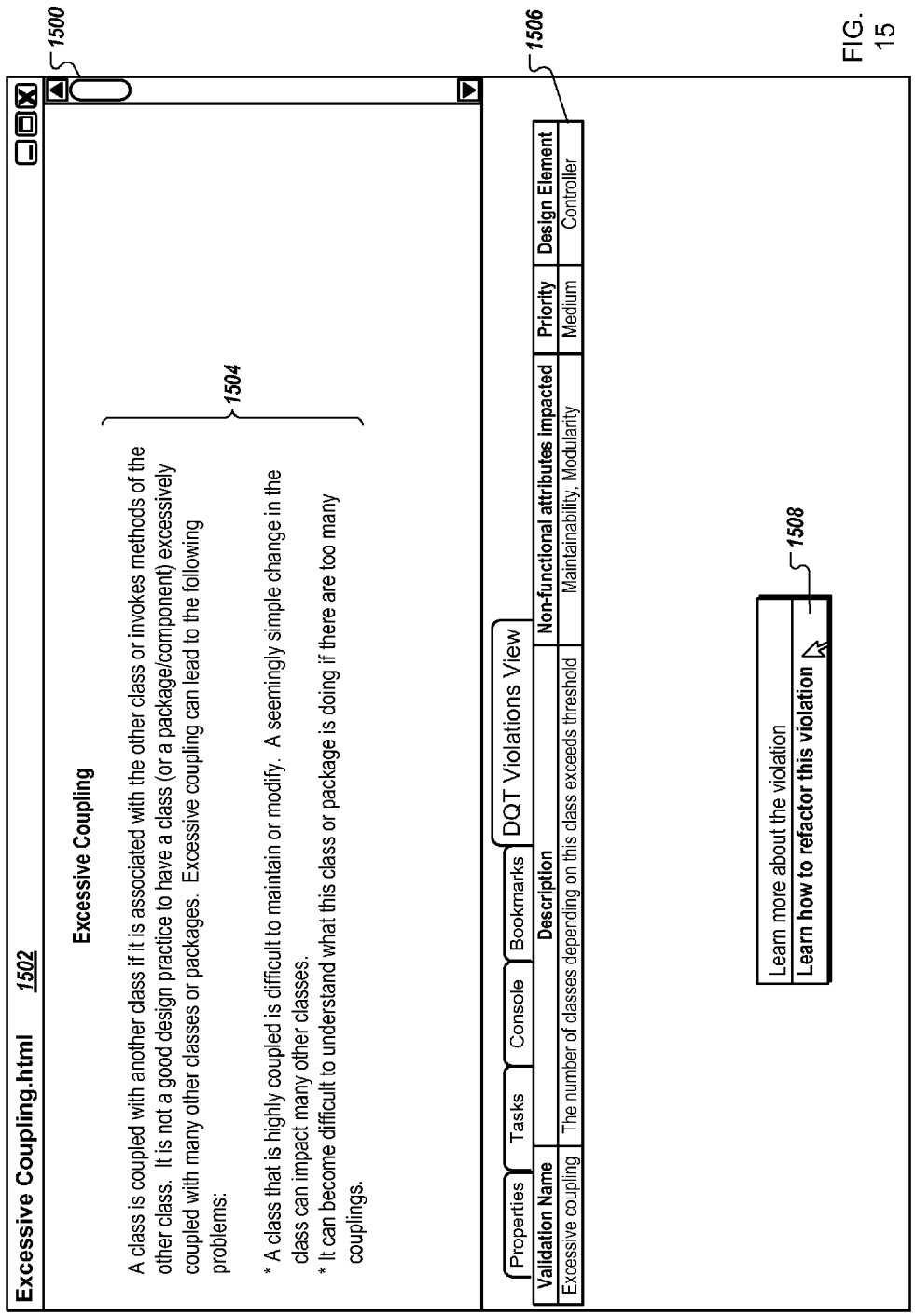

In response to the selection of the menu control 1418, a user interface such as the user interface 1500 illustrated in FIG. 15 may be displayed. The user interface 1500 includes a help view 1502, which includes a help description 1504 related to the excessive coupling violation 1506. The user may view refactoring suggestions related to the violation 1506 by, for example, selecting the violation 1506 and selecting a control such as a menu control 1508.

Figure 16:
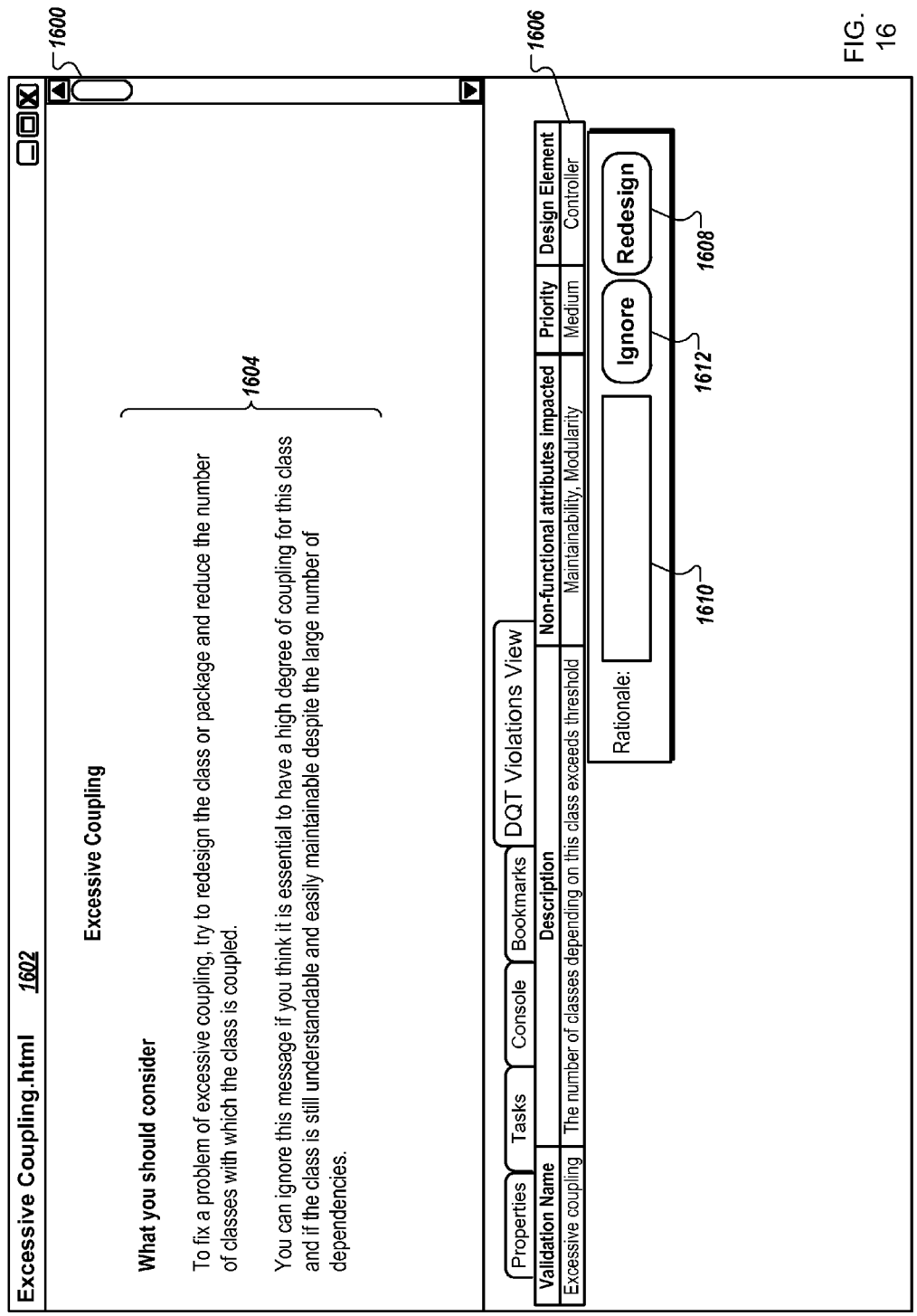

In response to the selection of the menu control 1508, a user interface such as the user interface 1600 illustrated in FIG. 16 may be displayed. The user interface 1600 includes a refactoring suggestion view 1602, which includes a refactoring discussion 1604. The user may use the refactoring suggestion to resolve the excessive-coupling violation 1606. For example, as mentioned in the refactoring discussion 1604, to fix a problem of excessive coupling, a designer may try to redesign the class or package and reduce the number of classes with which the class is coupled. For example, a designer can select a redesign control 1608 to return to a modeling view (e.g., modeling view 1404 described above with respect to FIG. 14) to redesign the model 1402. As another example, the designer may ignore an excessive coupling violation if, for example, the designer believes it is fine to have a high degree of coupling for the class and if the class is still understandable and easily maintainable despite the large number of dependencies. A designer may ignore a violation, for example, by entering a rationale for ignoring in a text entry control 1610 and selecting an ignore control 1612. The designer may be required to enter a rationale to ignore the violation.

Figure 17:
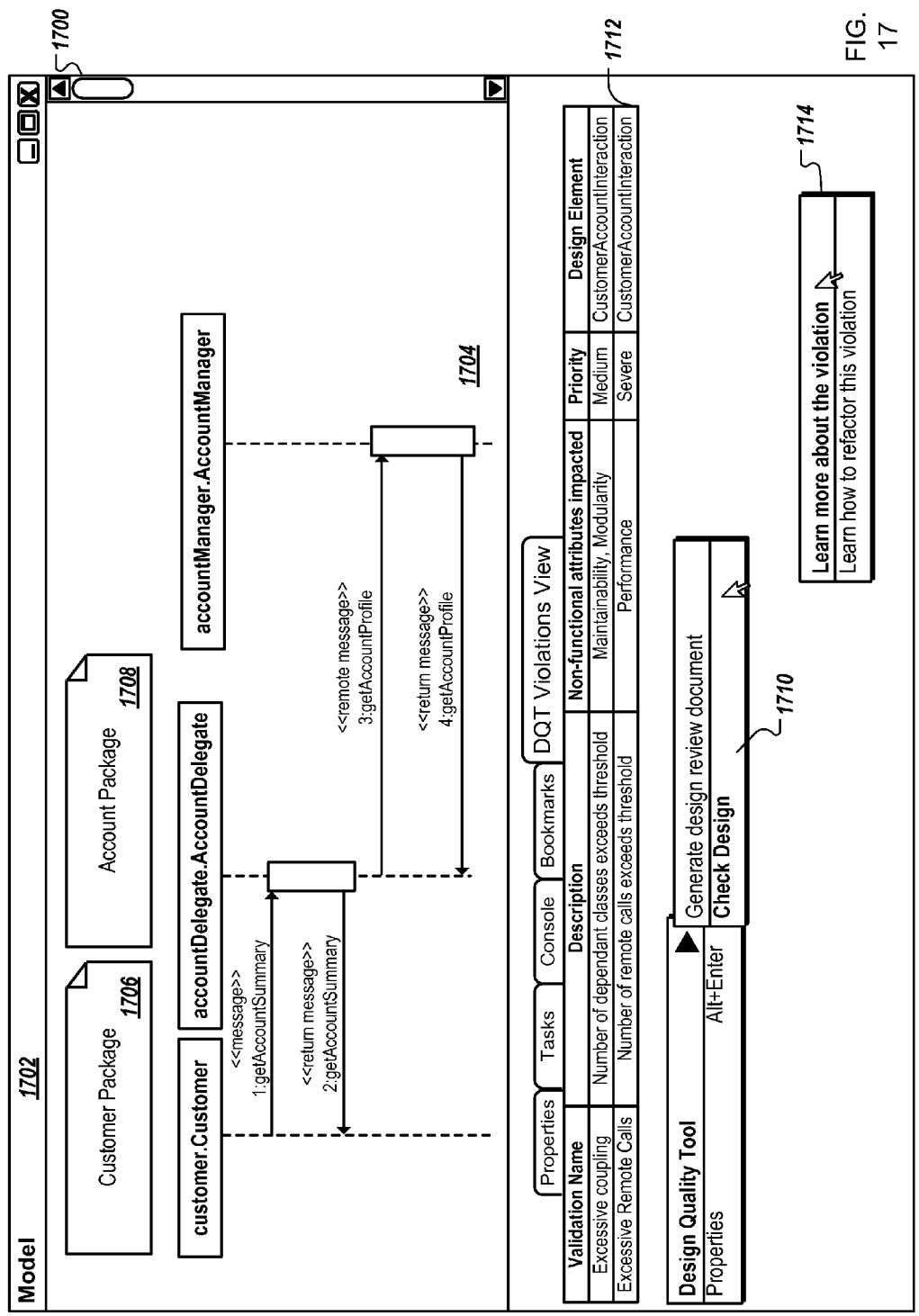

In addition to running rules on classes, interfaces, and packages, design quality rules may also be run on other design elements, such as sequence diagrams. For example, FIG. 17 illustrates a user interface 1700, which includes a model view 1702. The model view 1702 includes a sequence diagram 1704 modeling interactions between classes of a customer package 1706 and an account package 1708. The user may run design quality rules on the sequence diagram 1704, for example, by selecting a menu control 1710. Violations violating design quality rules may be shown, such as an excessive remote calls violation 1712. The excessive remote calls violation 1712 may result from the number of remote calls in the sequence diagram 1704 exceeding a threshold. The excessive remote calls violation 1712 is a severe violation which may have a significant impact on performance of the application under design. The user may learn more about the violation 1712 by, for example, selecting the violation 1712 and selecting a control such as a menu control 1714.

Figure 18:
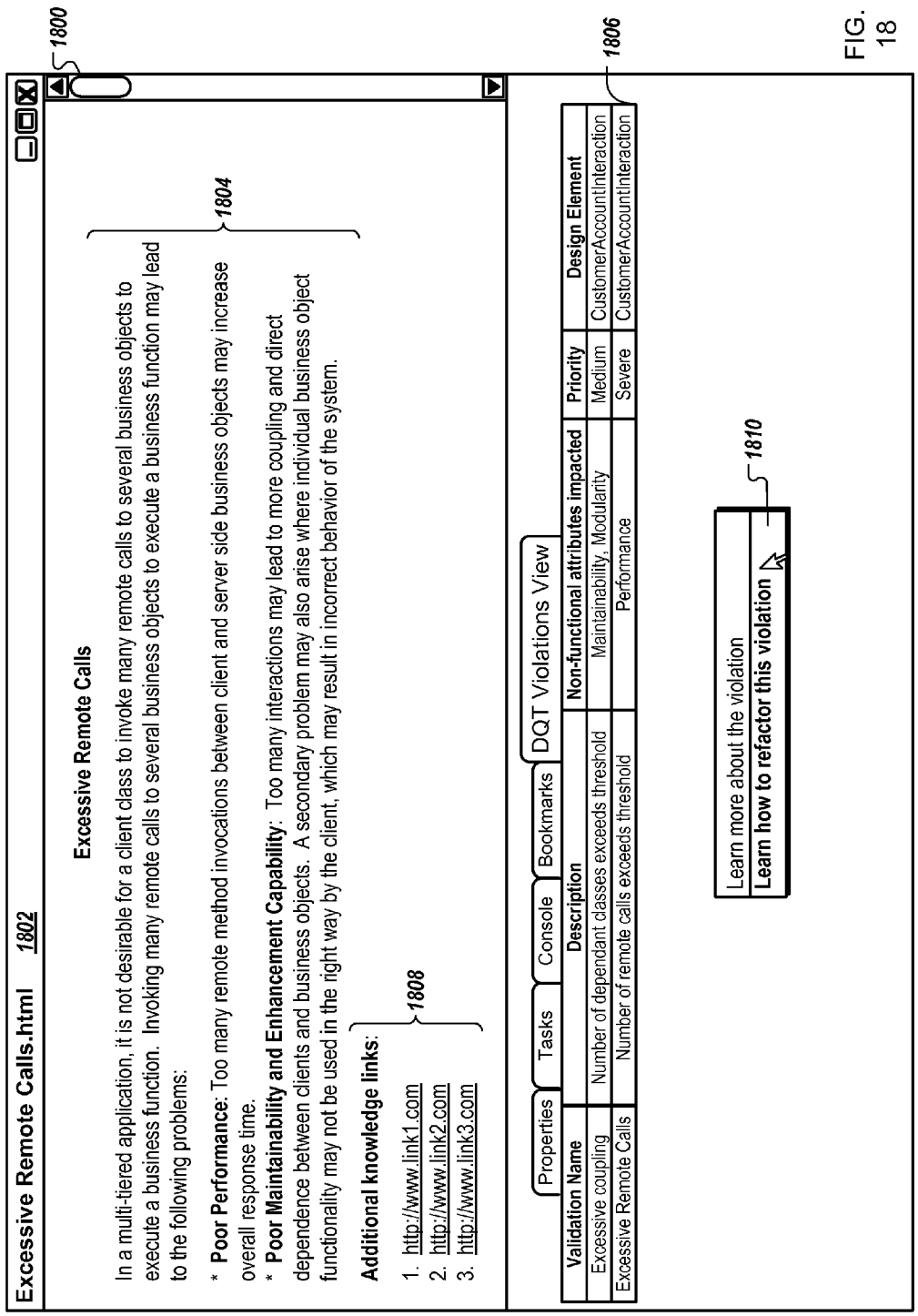

In response to the selection of the menu control 1714, a user interface such as the user interface 1800 illustrated in FIG. 18 may be displayed. The user interface 1800 includes a help view 1802 which includes a help description 1804 related to the excessive remote calls violation 1806. The help view 1802 may include one or more links 1808 to external resources (e.g., external web sites) which may include further information about the violation 1806. The user may view refactoring suggestions related to the violation 1806 by, for example, selecting the violation 1806 and selecting a control such as a menu control 1810.

In response to the selection of the menu control 1810, a user interface such as the user interface 1900 illustrated in FIG. 19 may be displayed. The user interface 1900 includes a refactoring suggestion view 1902, which includes a refactoring discussion 1904. The user may use the refactoring suggestion to resolve the excessive remote calls violation 1906, such as by referring to a "before and after" sequence diagram example 1908.

A design may be reviewed by stakeholders other than the designer. For example, a design review may be attended to, for example, by one or more subject matter experts, one or more designers, one or more developers, or one or more other project stakeholders. The user may generate a design review document by selecting a control such as menu control 1910. In response to selecting the menu control 1910, a user interface such as the user interface 2000 illustrated in FIG. 20 may be displayed. The user interface 2000 displays an example design review document 2002, which includes evaluation questions 2004. The evaluation questions 2004 may be based on violations in the model and may be used, for example, as a basis for a design review. An XML (eXtensible Markup Language) report (not shown) of violations may also be generated.

Figure 21:
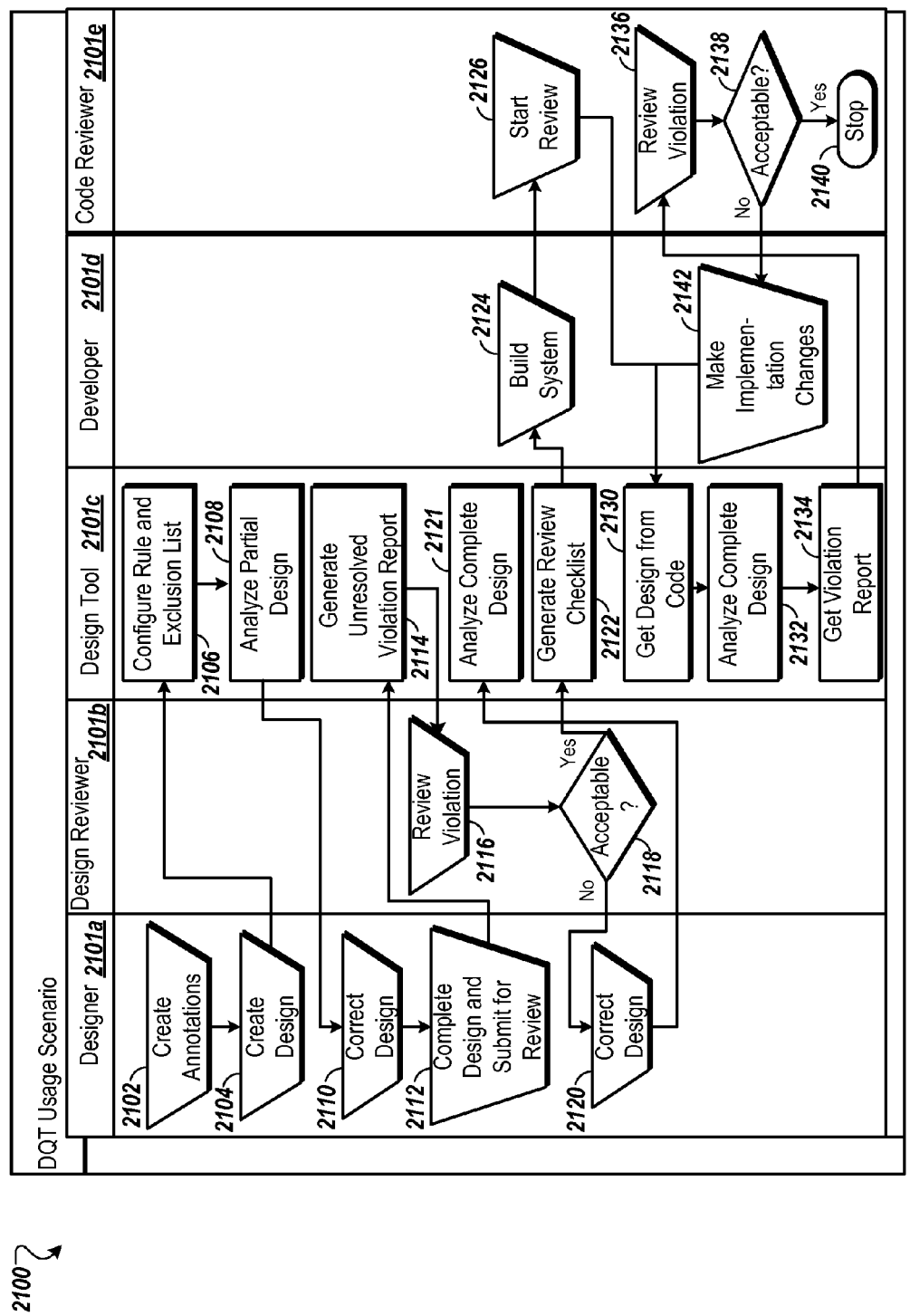

FIG. 21 illustrates a process 2100 for evaluating software. The operations of the process 2100 are described as being performed by a designer 2101a, a design reviewer 2101b, a design tool 2101c, a developer 2101d, and a code reviewer 2101e. The operations of the process 2100 described as being performed by the design tool 2101c may be performed, for example, by one of the components of the system 100 (e.g., the model processor 102) or may be performed by a combination of the components of the system 100. In some implementations, some or all of the operations of the process 2100 may be performed by one or more processors included in one or more electronic devices.

The designer 2101a creates one or more annotations (2102) and creates a design (2104). For example, the designer 2101a may create a software design using a modeling application and may create software design elements, such as classes, interfaces, packages, sequence diagrams, and interactions diagrams. The designer 2101a may create one or more annotations, which describe one or more design elements, using the modeling application.

A rule and exclusion list is configured using the design tool 2101c (2106). For example, the designer 2101a may use an interface of the design tool 2101c to create one or more custom rules, or to add one or more predefined rules, or one or more software design elements, to one or more exclusion lists.

A partial design is analyzed using the design tool 2101c (2108). For example, the designer 2101a may use an interface of the design tool 2101c to run design quality rules on the design. Violations may be reported to the designer 2101a in an interface of the design tool 2101c.

The designer 2101a corrects the design (2110). For example, the designer 2101a may correct the design using a modeling application, based on refactoring suggestions displayed by the design tool 2101c.

The designer 2101a completes an initial design and submits the initial design for review (2112). For example, the initial design may be submitted for review to the design reviewer 2101b. Before submitting the design to the design reviewer 2101b, the designer 2101a may generate an unresolved violation report (2114), for example, using the design tool 2101c.

The design reviewer 2101b reviews the unresolved violation report (2116) and may review other design documents, such as one or more modeling diagrams. In addition to examining specific violations, the design reviewer may consider a design quality composite index. A design quality composite index is discussed in more detail below.

If the design reviewer 2101b determines that the design is not acceptable (2118), the designer 2101a corrects the design (2120) and analyzes the complete, corrected design (2121). For example, the designer 2101a may use an interface of the design tool 2101c to run design quality rules on the design. Violations may be reported to the designer 2101a in an interface of the design tool 2101c.

If the design reviewer 2101b determines that the design is acceptable (2118), a review checklist is generated (2122). For example, a review checklist, which may include evaluation questions such as the evaluation questions 2004 described above with respect to FIG. 20, may be generated by the design tool 2101c. The developer 2101d builds the system (e.g., writes code based on the design), taking into account the generated design review checklist (2124). The code reviewer 2101e starts reviewing the code (2126) according to code review guidelines.

In some situations, a reverse-engineered design may be evaluated. For example, a design may be reverse-engineered from code using the design tool 2101c (2130). For example, a reverse-engineered design may be evaluated to determine whether violations in the reverse-engineered design are detected or to determine whether inconsistencies exist between the original design and a reverse-engineered design based on the implemented code (e.g., to determine whether the developer 2101d built the system as designed).

The reverse-engineered design is analyzed (2132). For example, the designer 2101a or the developer 2101d may use an interface of the design tool 2101c to run design quality rules on the design. Analyzing the reverse-engineered design may include comparing the reverse-engineered design to the original design (e.g., the design analyzed in step 2121), to determine whether the reverse-engineered design deviates from the original design. As described above with respect to FIG. 2, different approaches may be used to determine whether the reverse-engineered design deviates from the original design. For example, a UML diagram associated with the reverse-engineered design may be compared to a UML diagram associated with the original design, structural metrics associated with the reverse-engineered design may be compared to structural metrics associated with the original design, or violations obtained from running design quality rules on the reverse-engineered design may be compared to violations obtained from running design quality rules on the original design.

In some implementations, violations may be reported in a user interface generated by the design tool 2101c. As another example, a violation report may be generated (2134). The code reviewer 2101e may review the violations (2136). If the violations are acceptable (2138), the process 2100 ends (2140). If the violations are not acceptable (2138), the developer 2101d makes implementation changes (2142), and an updated design may be retrieved from the updated code (2130). The updated design is analyzed (2132), a violation report is generated (2134), and the violations are reviewed (2136). A similar process may repeat until the code reviewer 2101e determines that the violation report is acceptable (2138).

Figure 22:
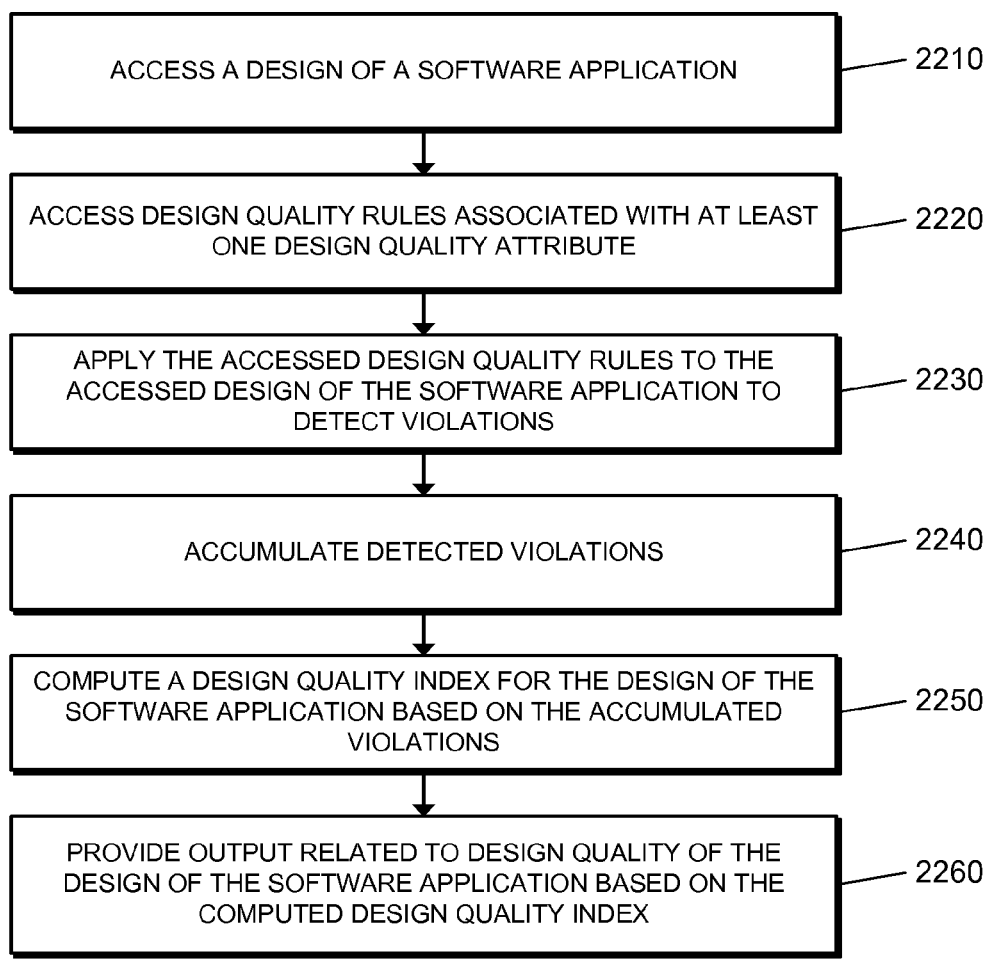

FIG. 22 illustrates a process 2200 for computing a design quality index. The operations of the process 2200 are described generally as being performed by the system 100. The operations of the process 2200 may be performed by one of the components of the system 100 (e.g., the model processor 102) or may be performed by a combination of the components of the system 100. In some implementations, operations of the process 2200 may be performed by one or more processors included in one or more electronic devices.

The system 100 accesses a design of a software application (2210). For example, in reference to FIG. 1, the model processor 102 may access the design from the UML design repository 104.

The system 100 accesses design quality rules associated with at least one design quality attribute (2220). For example, in reference to FIG. 1, the rules engine 122 may access design quality rules from the design quality rules repository 124, where the accessed design quality rules are defined to evaluate quality of designs of software applications in terms of one or more design quality attributes. The rules engine 122 may access, for example, all design quality rules stored in the design quality rules repository 124, or the rules engine may access a subset of rules stored in the design quality rules repository 124. The rules engine 122 may identify a subset of design quality rules that are classified as pertaining to the one or more accessed design quality attributes. Design quality rules may pertain, for example, to a performance design quality attribute, a security design quality attribute, a rigidity design quality attribute, or another type of design quality attribute.

The system 100 applies the accessed design quality rules to the accessed design of the software application to detect violations (2230). For example, the accessed design quality rules may be applied to the accessed design as described above with respect to FIG. 4. In the process 400 of FIG. 4, a design quality rule, the type of design element on which the design quality rule is to be applied, and a design element of the identified type are identified. If the design element is not in an exclusion list for the design quality rule and if the rule has not already been applied to the design element, the design quality rule is applied to the design element. If it is determined that the design quality rule is violated, a violation is added to a violation list. The design quality rule is applied to any remaining available design elements. Similar processing occurs for other design quality rules until all design quality rules have been applied.

The system 100 accumulates detected violations (2240). For example, detected violations may be stored in a violations list. The system 100 may accumulate all violations detected by applying the identified design quality rules. As another example, the system 100 may identify the detected violations that pertain to the one or more design quality attributes and may accumulate only the identified violations that pertain to the one or more design quality attributes. The system 100 may aggregate, for the one or more design quality attributes, the detected violations across each class included in the accessed design of the software application and the system 100 may accumulate, for the one or more design quality attributes, the detected violations across the design of the software application using the aggregated violations for each class included in the accessed design of the software application. The system 100 may count the detected violations that pertain to the one or more design quality attributes.

The system 100 computes a design quality index for the design of the software application based on the accumulated violations (2250). To define the design quality index, a number of notations are introduced below. A software system may be represented by a set of design entities Ent. Each design entity d∈Ent has a type. The set of all such design entity types may be represented by $\Gamma$ and an individual type may be represented by $\tau \in \Gamma$. In some implementations, $\Gamma=\{$class, interface, method, package$\}$. Further, $\tau_d$ may denote the type of a design element d. A design quality rule set as a whole may be represented by R and an individual design quality rule by r. A design quality rule r may be applicable to one and only one design entity type $\tau$. A subset of design quality rules $\tau(R) \subseteq R$ may be defined as the subset of design quality rules that are applicable for a design type $\tau$. Furthermore, $\tau_r$ may be defined to denote the design type applicable to r. Different design quality rules are applicable for different design quality attributes such as maintainability, extensibility, performance, security, rigidity, etc. Let QA be the set of design quality attributes and QARules(q) be the set of design quality rules that impacts the attribute q.

A design quality rule r models a design defect. When the design defect modeled by r is present in a design entity d, it may be defined that r(d)=true. It may be assumed that a design quality rule accurately models a design defect. A design quality rule r may be associated with a user defined importance factor $\alpha$ and correspondingly, $\alpha_r$ may denote the importance factor associated with the design quality rule r.

Using the notations defined above, $\tau_d(R)$ may be defined as the set of all possible design defects that are possible to be found in the design entity d (the design entity d may, in fact, have no design defects). A set of design quality rules Vio(d) may be defined such that $Vio_q(d)=\{r | r \in \tau_d(R)$ and $r \in QARules(q)$ and $r(d)=true\}$ which indicates the set of design quality rules applicable for the design entity d after checking the design entity d for design violations pertaining to a set of design quality attributes. A design quality index DQI(d) may be defined such that $$DQI_q(d) = 1 - \frac{\sum_{r \in Vio_q(d)} \alpha_r}{\sum_{r \in (\tau_d(R) \cap QARules(q))} \alpha_r}$$

where a DQI equal to zero is a worst quality case and a DQI equal to one is a best quality case (meaning no violations). With $DQI_q(d)$ defined as a design quality index for a design element d with respect to the quality attribute q, a design quality index for the entire system may be defined as $$DQI_q(System) = \frac{\sum_{d \in Ent} DQI_q(d)}{|Ent|}$$

where a higher DQI indicates higher quality and a lower DQI indicates lower quality. The design quality index may be used to assess software design quality using any of the techniques described throughout this disclosure.

The system 100 provides output related to design quality of the design of the software application based on the computed design quality index (2260). For example, a computed design quality index may be displayed to the user, such as on a user interface and/or on a printed report.

Figure 23:
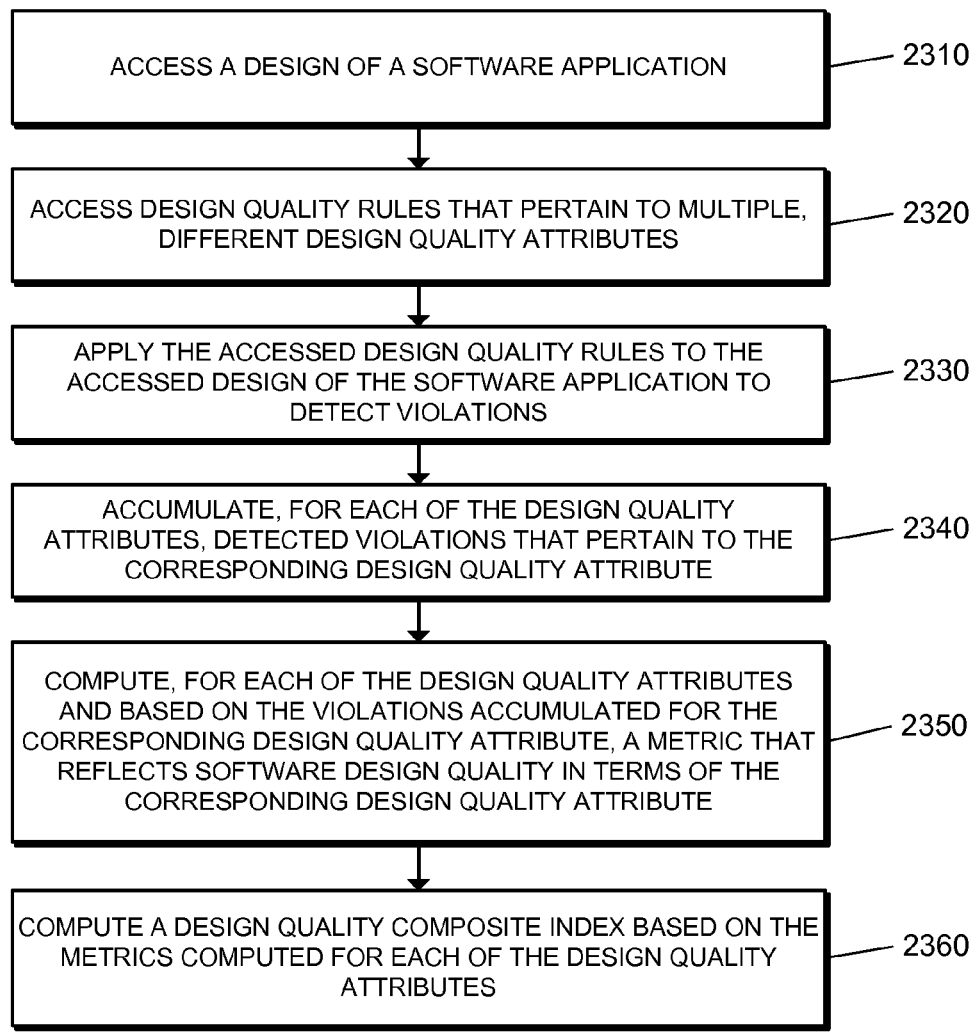

FIG. 23 illustrates a process 2300 for computing a design quality index. The operations of the process 2300 are described generally as being performed by the system 100. The operations of the process 2300 may be performed by one of the components of the system 100 (e.g., the model processor 102) or may be performed by a combination of the components of the system 100. In some implementations, operations of the process 2300 may be performed by one or more processors included in one or more electronic devices.

The system 100 accesses a design of a software application (2310). For example, in reference to FIG. 1, the model processor 102 may access the design from the UML design repository 104.

The system 100 accesses design quality rules that pertain to multiple, different design quality attributes (2320). For example, in reference to FIG. 1, the rules engine 122 may access design quality rules from the design quality rules repository 124. The rules engine 122 may access, for example, design quality rules that pertain to all design quality attributes evaluated by the system 100, or, as another example, the rules engine 122 may access design quality rules that pertain to a performance design quality attribute, a security design quality attribute, and a rigidity design quality attribute.

The system 100 applies the accessed design quality rules to the accessed design of the software application to detect violations (2330). For example, the accessed design quality rules may be applied to the accessed design as described above with respect to FIG. 4.

Figure 24:
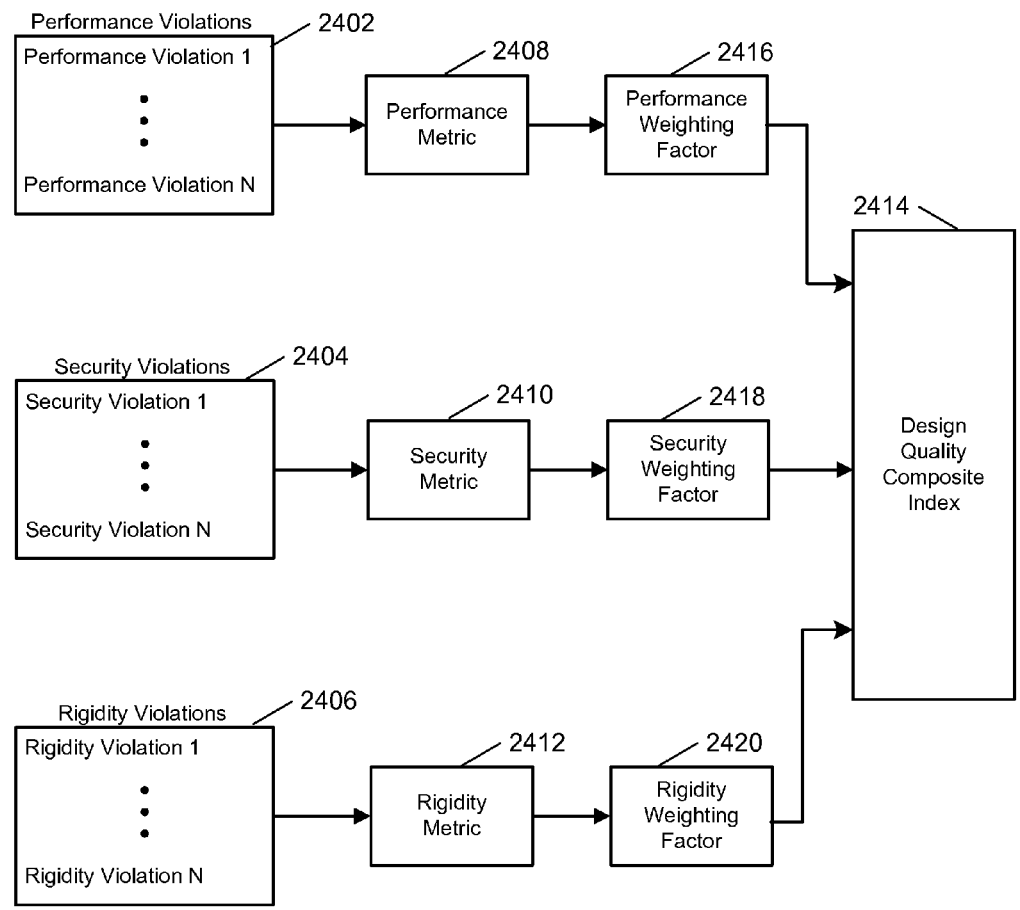
FIG. 24 illustrates computation of a design quality composite index.

The system 100 accumulates, for each of the design quality attributes, detected violations that pertain to the corresponding design quality attribute (2340). Violations may be accumulated using one or more violations lists. For example and as shown in FIG. 24, performance violations for a performance design quality attribute may be accumulated using a performance violations list 2402, security violations for a security design quality attribute may be accumulated using a security violations list 2404, and rigidity violations for a rigidity design quality attribute may be accumulated using a rigidity violations list 2406.

The system 100 computes, for each of the design quality attributes and based on the violations accumulated for the corresponding design quality attribute, a metric that reflects software design quality in terms of the corresponding design quality attribute (2350). For instance, in the example of FIG. 24, a performance metric 2408 may be computed for a performance design quality attribute, a security metric 2410 may be computed for a security design quality attribute, and a rigidity metric 2412 may be computed for a rigidity design quality attribute. The performance metric 2408 may be computed based on the violations included in the performance violations list 2402 and may reflect software design quality in terms of performance. The security metric 2410 may be computed based on the violations included in the security violations list 2404 and may reflect software design quality in terms of security. The rigidity metric 2412 may be computed based on the violations included in the rigidity violations list 2406 and may reflect software design quality in terms of how flexible the accessed design of the software application is to change. Computing the rigidity metric 2412 is described in more detail below with respect to FIG. 25.

Returning to FIG. 23, the system 100 computes a design quality composite index based on the metrics computed for each of the design quality attributes (2360). For instance, in the example of FIG. 24, a design quality composite index 2414 may be computed. The design quality composite index 2414 may be computed by summing a performance value, a security value, and a rigidity value. The performance value may be determined by multiplying the performance metric 2408 by an accessed performance weighting factor 2416. The security value may be determined by multiplying the security metric 2410 by an accessed security weighting factor 2418. The rigidity value may be determined by multiplying the rigidity metric 2412 by the rigidity weighting factor 2420.

Figure 25:
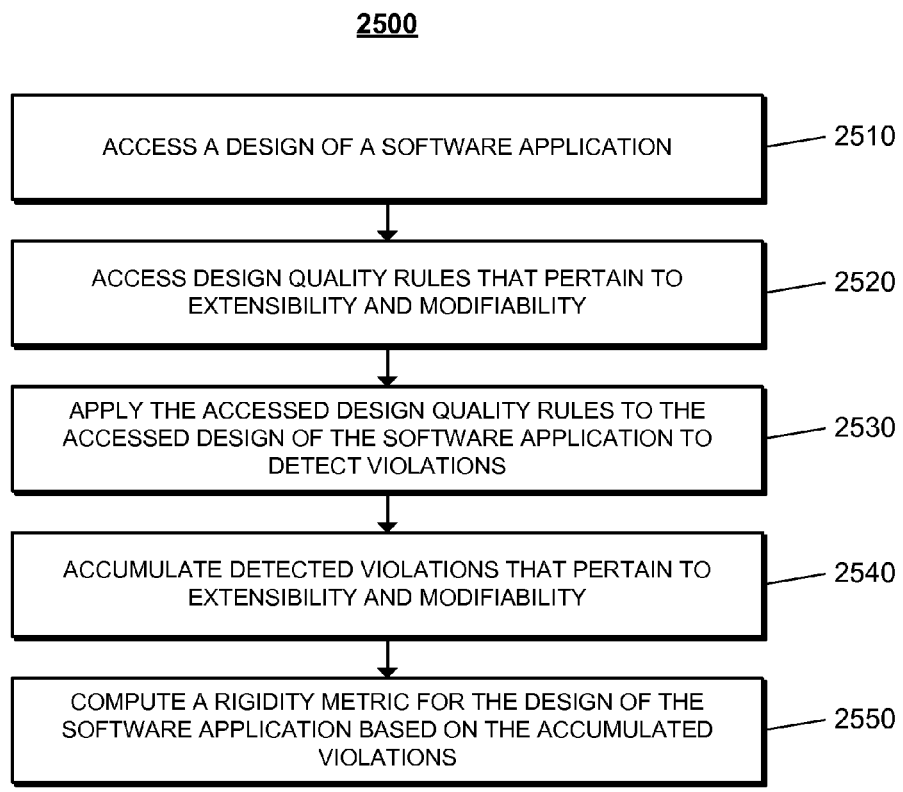

FIG. 25 illustrates a process 2500 for computing a rigidity metric. The operations of the process 2500 are described generally as being performed by the system 100. The operations of the process 2500 may be performed by one of the components of the system 100 (e.g., the model processor 102) or may be performed by a combination of the components of the system 100. In some implementations, operations of the process 2500 may be performed by one or more processors included in one or more electronic devices.

A design reviewer may consider rigidity of the design of a software application. In general, a design quality rule models a particular design defect and a design defect, in turn, adversely impacts software quality. Several design defects discussed above adversely impact software extensibility and modifiability. In other words, if such a design defect is present in a software system, the defect may cause the software system to be less extensible and modifiable. As the software system becomes less extensible and modifiable, it may become more rigid. A rigid system, even when it correctly executes functionality, may be difficult to modify and change when it undergoes maintenance. An attempt may be made to quantify how a design defect impacts the rigidity of a system.

When the process 2500 begins, the system 100 accesses a design of a software application (2510). For example, in reference to FIG. 1, the model processor 102 may access the design from the UML design repository 104.

The system 100 accesses design quality rules that pertain to extensibility and modifiability (2520). For example, in reference to FIG. 1, the rules engine 122 may access design quality rules pertaining to extensibility and modifiability from the design quality rules repository 124. For example and in reference to FIG. 6, the excessive inheritance design quality rule 604, the high-coupling, high-inheritance, and high dependency out design quality rule 608, the godly inheritance design quality rule 614, the PIF design quality rule 616, the violation of design-to-contract principle design quality rule 620, and the violation of open-close principle design quality rule 626 may be accessed.

The system 100 applies the accessed design quality rules to the accessed design of the software application to detect violations (2530). For example, the accessed design quality rules may be applied to the accessed design as described above with respect to FIG. 4.

Figure 26:
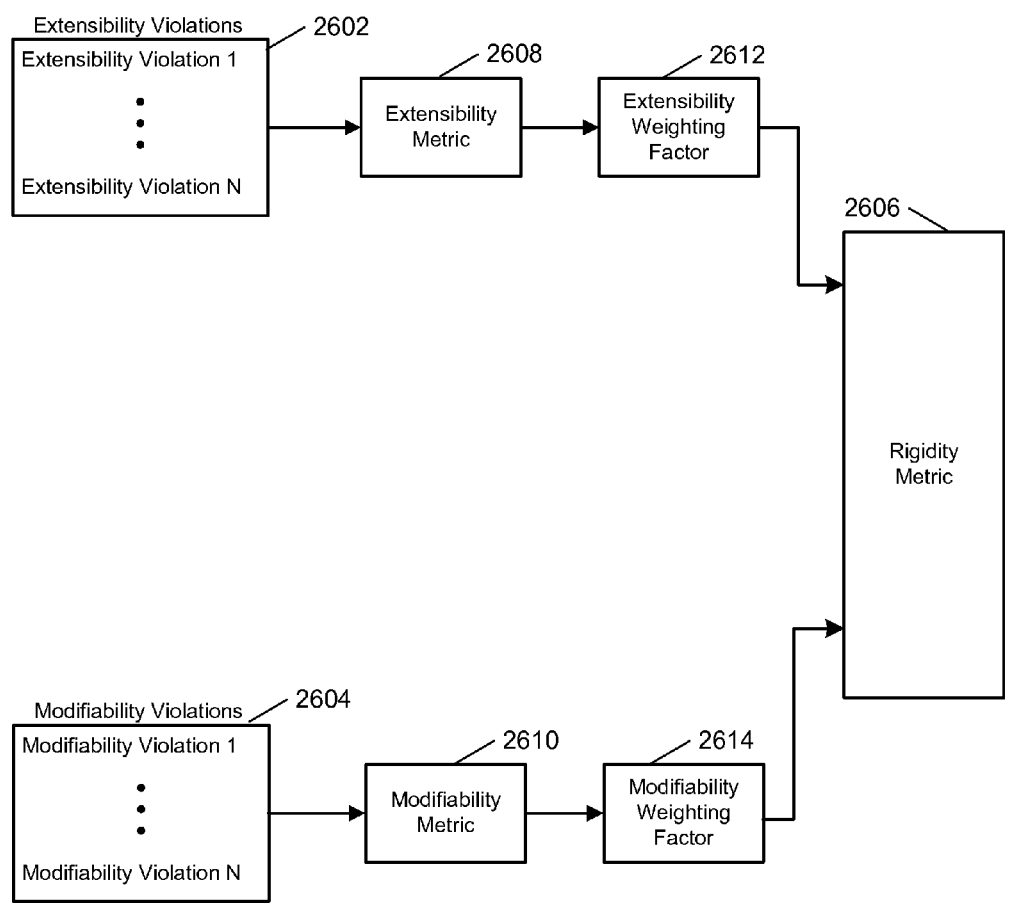
FIG. 26 illustrates computation of a rigidity metric.

The system 100 accumulates detected violations that pertain to extensibility and modifiability (2540). Violations may be accumulated using one or more violations lists. For example and as shown in FIG. 26, violations that pertain to the extensibility of the design of the software application may be accumulated using an extensibility violations list 2602, and violations that pertain to the modifiability of the design of the software application may be accumulated using a modifiability violations list 2604.

The system 100 computes a rigidity metric for the design of the software application based on the accumulated violations (2550). For instance, in the example of FIG. 26, a rigidity metric 2606 may be computed. The rigidity metric 2606 indicates how resistant a system would be to a change in design caused either due to design refactoring during system design or a code change as a result of a change request. The rigidity metric 2606 may be computed based on an extensibility metric 2608 and a modifiability metric 2610. The extensibility metric 2608 may be computed based on the accumulated violations in the extensibility violations list 2602 and the modifiability metric 2610 may be computed based on the accumulated violations in the modifiability violations 2604. An extensibility weighting factor 2612 and a modifiability weighting factor 2614 may be accessed. The extensibility metric 2608 may be multiplied by the extensibility weighting factor 2612 to determine an extensibility value and the modifiability metric 2610 may be multiplied by the modifiability weighting factor 2614 to determine a modifiability value. The extensibility value and the modifiability value may be summed to determine the rigidity metric 2606.

As another example, the rigidity metric 2606 may be calculated using the formula:

$$\Omega(d) = e^{\lambda \cdot (1 - DQIq(d))}$$

where DQIq is the DQI specific to the design quality attribute q and $\lambda$ is a user defined parameter that can vary depending on the design entity type (e.g., class, package).

Figure 27:
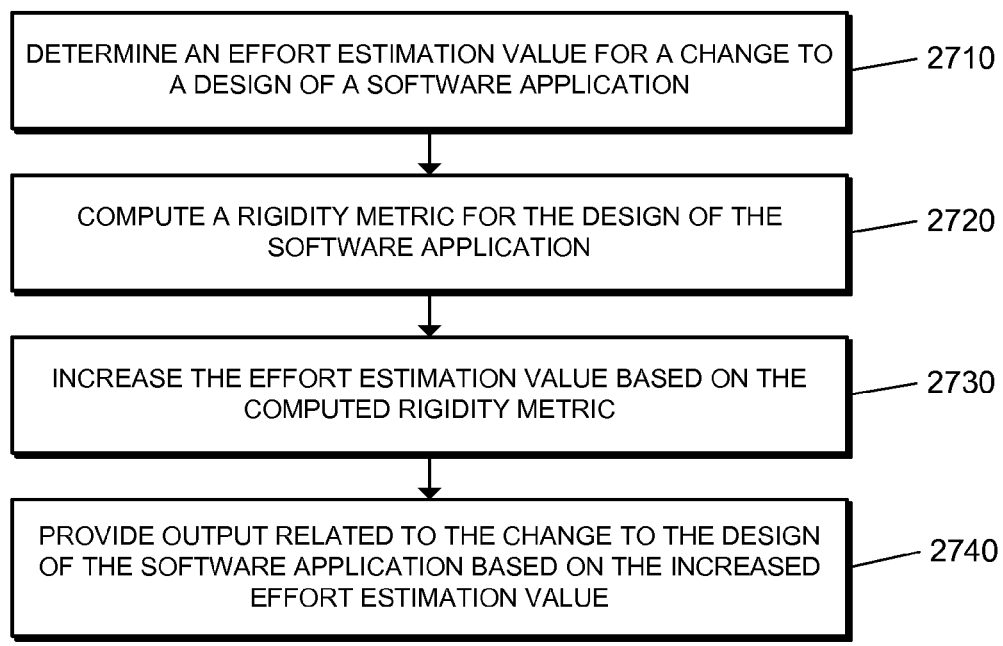

FIG. 27 illustrates a process 2700 for updating an estimation value based on a computed rigidity metric. The operations of the process 2700 are described generally as being performed by the system 100. The operations of the process 2700 may be performed by one of the components of the system 100 (e.g., the model processor 102) or may be performed by a combination of the components of the system 100. In some implementations, operations of the process 2700 may be performed by one or more processors included in one or more electronic devices.

The system 100 determines an effort estimation value for a change to a design of a software application (2710). For example, a package d may need modification. A designer may, based on the nature of a change request, estimate an effort(d). The estimate effort(d) may not take into account the additional complexity that may arise due to rigidity of the package d.

The system 100 computes a rigidity metric for the design of the software application (2720). For example, a rigidity metric may be computed as described above with respect to FIG. 25.

The system 100 increases the effort estimation value based on the computed rigidity metric (2730). In general, rigidity information may be used to consider impact on maintainability. The modified estimate may be calculated as $$\text{effort}'(d) = \text{effort}(d)\Omega(d)$$

where $\Omega(d)$ is the computed rigidity metric.

When a package d is completely malleable (e.g., $\Omega(d)=1$), then the modified estimation effort'(d) has a value equal to the initial estimation effort(d). However, in other cases where the package d is not completely malleable, the estimated effort effort(d) may increase by a factor of $e^{\lambda \cdot (1-DQIq(d))}$ due to rigidity.

Figure 28:
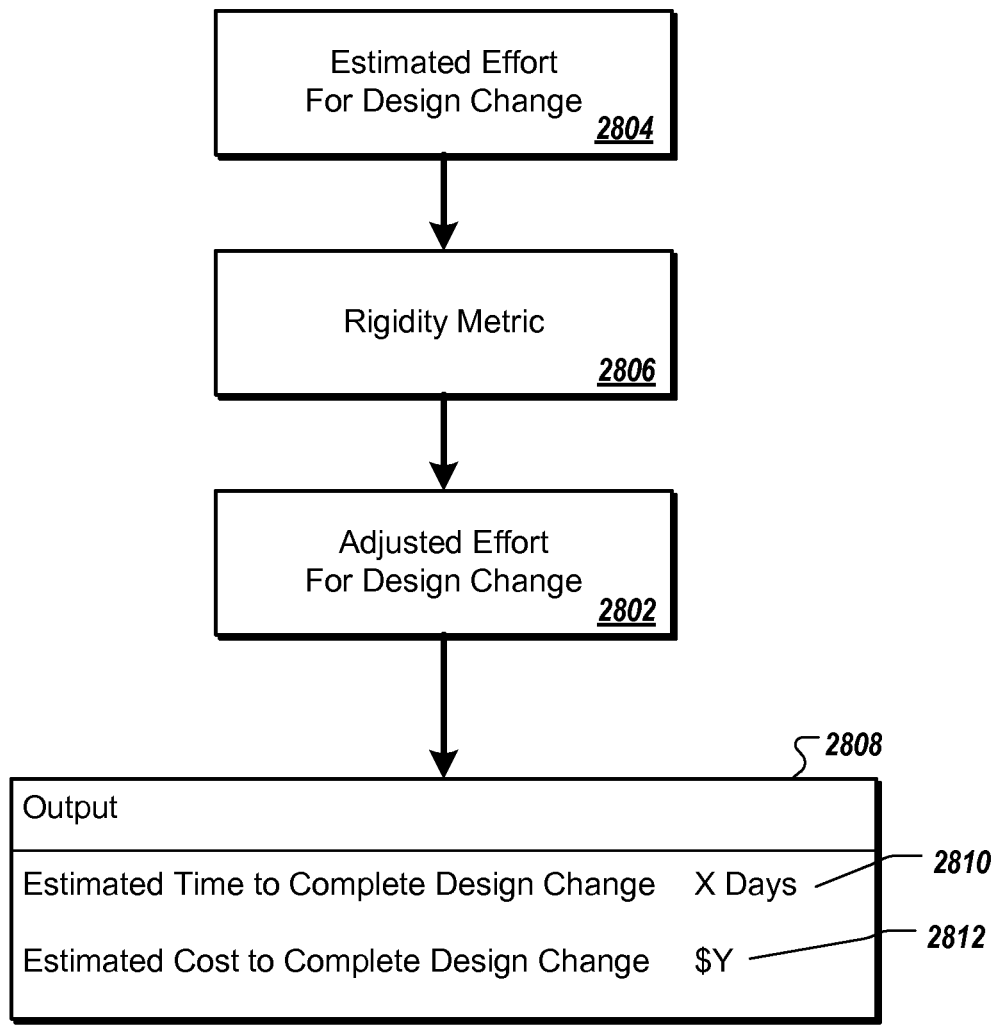
FIG. 28 illustrates the adjustment of an estimated effort for design change based on a rigidity metric.

As another example, FIG. 28 illustrates change in effort estimation. An adjusted effort for design change 2802 may be calculated, for example, by multiplying an initial estimated effort for design change 2804 by a rigidity metric 2806.

Returning to FIG. 27, the system 100 provides output related to the change to the design of the software application based on the increased effort estimation value (2740). For instance, in the example of FIG. 28, output 2808 may be provided, where the output 2808 includes an estimated time 2810 to complete the design change and an estimated cost 2812 to complete the design change.

Figure 29:
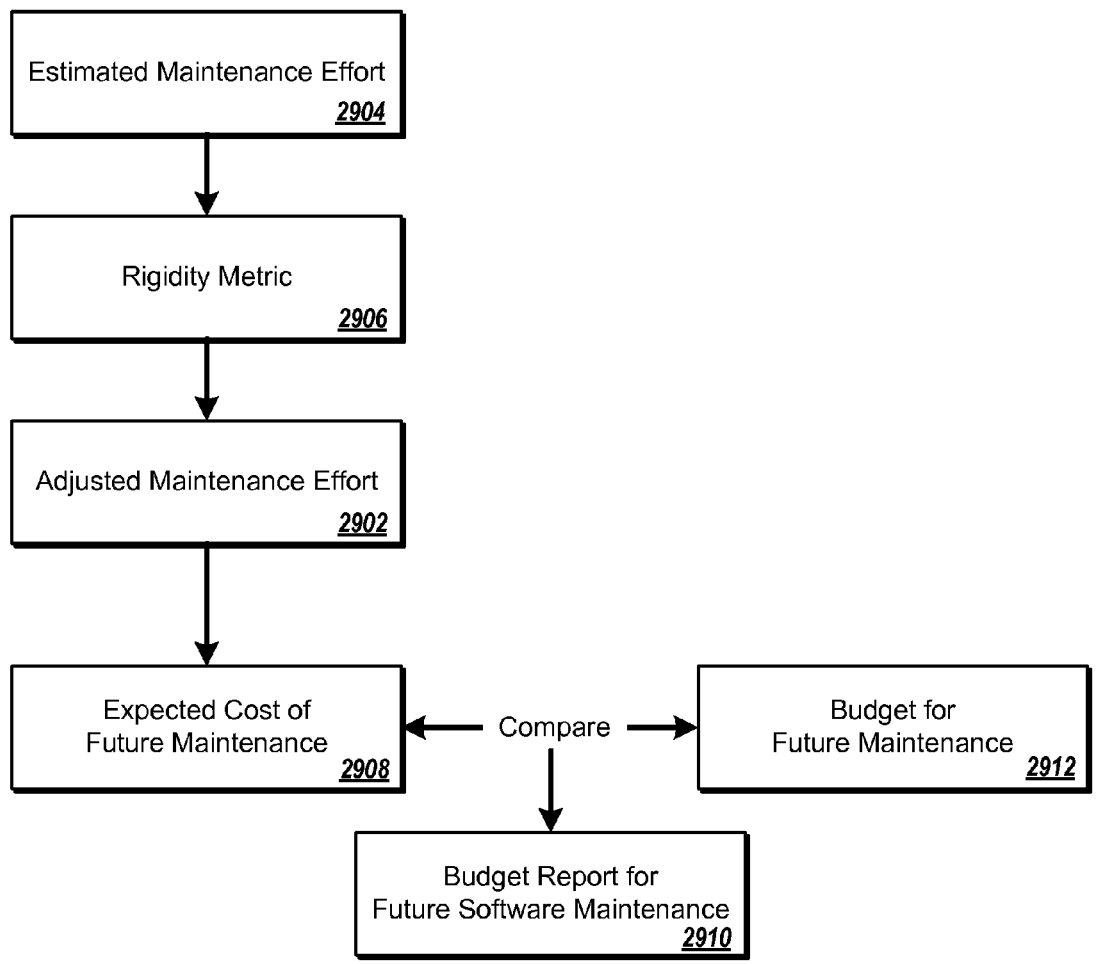
FIG. 29 illustrates the adjustment of an estimated maintenance effort based on a rigidity metric.

A rigidity metric may also be used to estimate an effort of maintaining a software application. For example and as shown in FIG. 29, an adjusted maintenance effort 2902 may be computed by multiplying an initial estimated maintenance effort 2904 by a rigidity metric 2906. An expected cost of future maintenance 2908 may be computed based on the adjusted maintenance effort 2902. A budget report 2910 for future software maintenance may be generated and may include a comparison of the expected cost of future maintenance 2908 and a budget 2912 for future maintenance.

Figure 30:
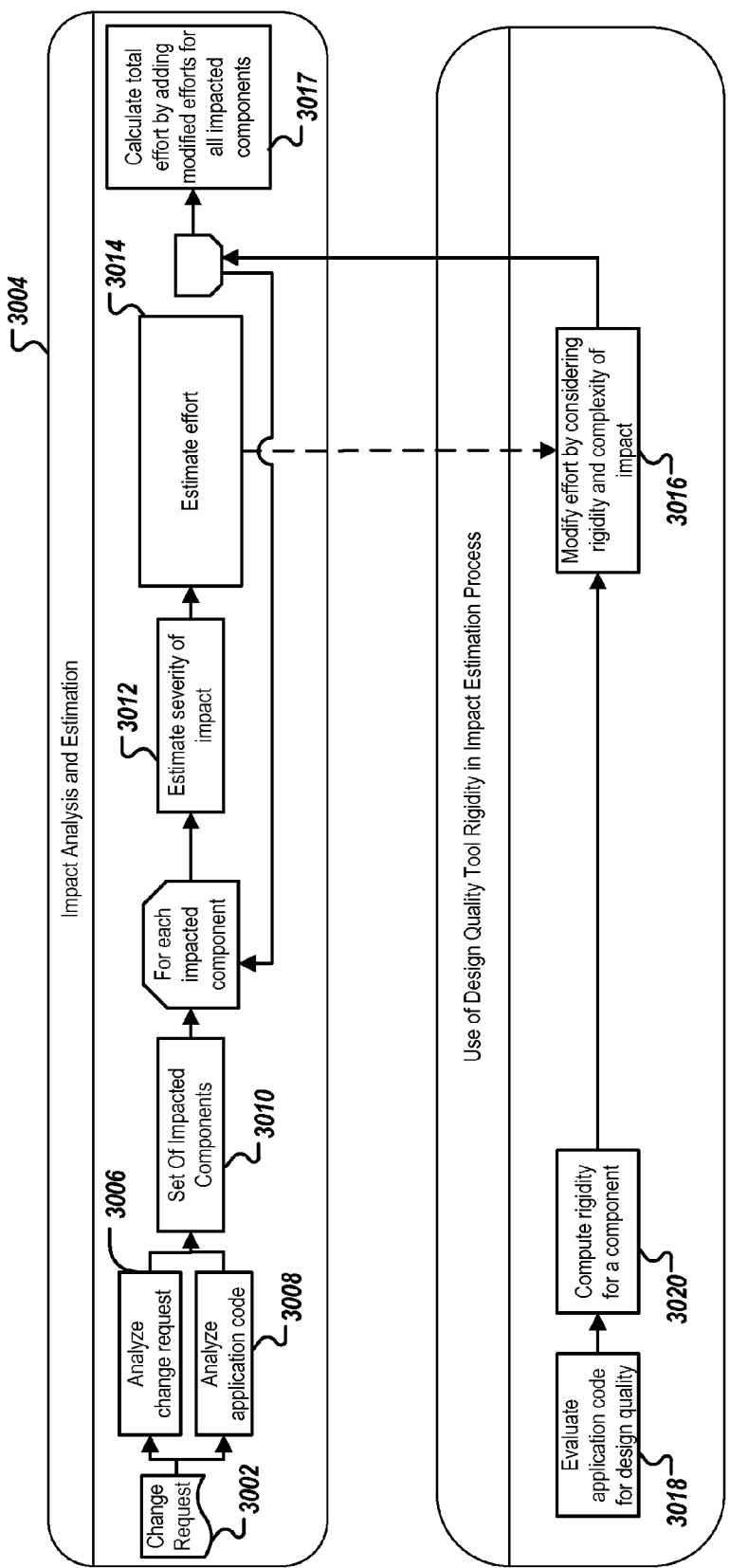
FIG. 30 illustrates the adjustment of an estimate to implement a change request based on rigidity.

FIG. 30 illustrates estimating an effort to implement a change request based on rigidity. A change request 3002 may be received. The change request 3002 may be, for example, a document which describes requested changes to a system, such as requests for added, changed, or removed functionality. As part of an impact analysis and estimation process 3004, the change request 3002 may be analyzed (3006) and application code of the system may be analyzed (3008) to identify a set of impacted components 3010.

The change request 3002 may be analyzed manually, by an automatic process (e.g., a text processing or text recognition process), or by a combination of one or more manual or automated processes, to identify code components which need to be changed to implement the change request 3002. The change request 3002 may include one or more requested changes. For each requested change, one or more change types may be identified. For example, a change may be or may involve a user interface change, a business logic change, a database-related change, or a customization of a pre-configured object, to name a few examples.

The set of impacted components 3010 may include primary components that may be changed to implement the change request 3002, as well as secondary components which also may be changed due to a dependence on one or more primary components. For each impacted component 3010, an estimate of severity of impact may be determined (3012). A severity of impact estimate may include a volume estimate and a complexity estimate. For example, volume may be defined as units of code to be changed. As one example, if the change request results in changes to business logic, a volume estimate may be specified as a number of code methods to be changed. As another example, if the change request involves user interface changes, the number of user interfaces or number of user interface elements impacted may be included in a volume estimate. Volume estimates also may include an estimation of test effort (e.g., testing of primary components changed and regression testing of other parts of the system). A complexity estimate may correspond to estimated effort to implement a change. For example, complexity may be estimated as one of "high," "medium," or "low."

For each impacted component, an effort estimate is calculated (3014), based on the severity of impact estimate. An effort estimate may be, for example, a number of person hours estimated to change the impacted component to satisfy the change request 3002. An effort estimate may take into account rigidity of the impacted component. For example, an estimate effort may be modified by considering rigidity and complexity of impact of the impacted component (3016). A final estimate of implementing the change request 3002 may be calculated (3017), for example, by combining (e.g., adding together) modified efforts for all impacted components 3010.

As an example, application code may be evaluated for design quality (3018), and for each impacted component 3010, a rigidity metric may be computed (3020). For example, a rigidity metric may be computed as described above with respect to FIG. 25. Also as described above, a rigidity metric may be calculated for a component d as $$\Omega(d) = e^{\lambda \cdot (1 - DQIq(d))}$$

where $DQIq$ is a DQI specific to the design quality attribute q, and $\lambda$ is a user defined parameter that can vary depending on the design entity type (e.g., class, package). The design quality attribute q may be, for example, modifiability and/or extensibility. Instead of or in combination with varying $\lambda$ based on the design entity type, $\lambda$ may be varied corresponding to a complexity estimate for the impacted component. For example, $\lambda$ may be varied based on whether a complexity estimate is "high," "medium," or "low." For example, if a complexity estimate is "low" for an impacted component, $\lambda$ may be set to zero, which may result in $\Omega(d)$ having a value of one. As described above, a modified effort'(d) for a component d may be calculated as $$\text{effort}'(d) = \text{effort}(d)\Omega(d)$$

and if $\Omega(d)$ has a value of one, then the modified effort'(d) may be equal to an original estimated effort.

As another example, if a complexity estimate for an impacted component is "high," $\lambda$ may be set to one, which means that $\Omega(d)$ may have a value from one to 2.718, depending on DQI(d). Put another way, a modified effort'(d) may be from one to nearly three times an original effort estimate, based on the degree of rigidity of the component d.

Figure 31:
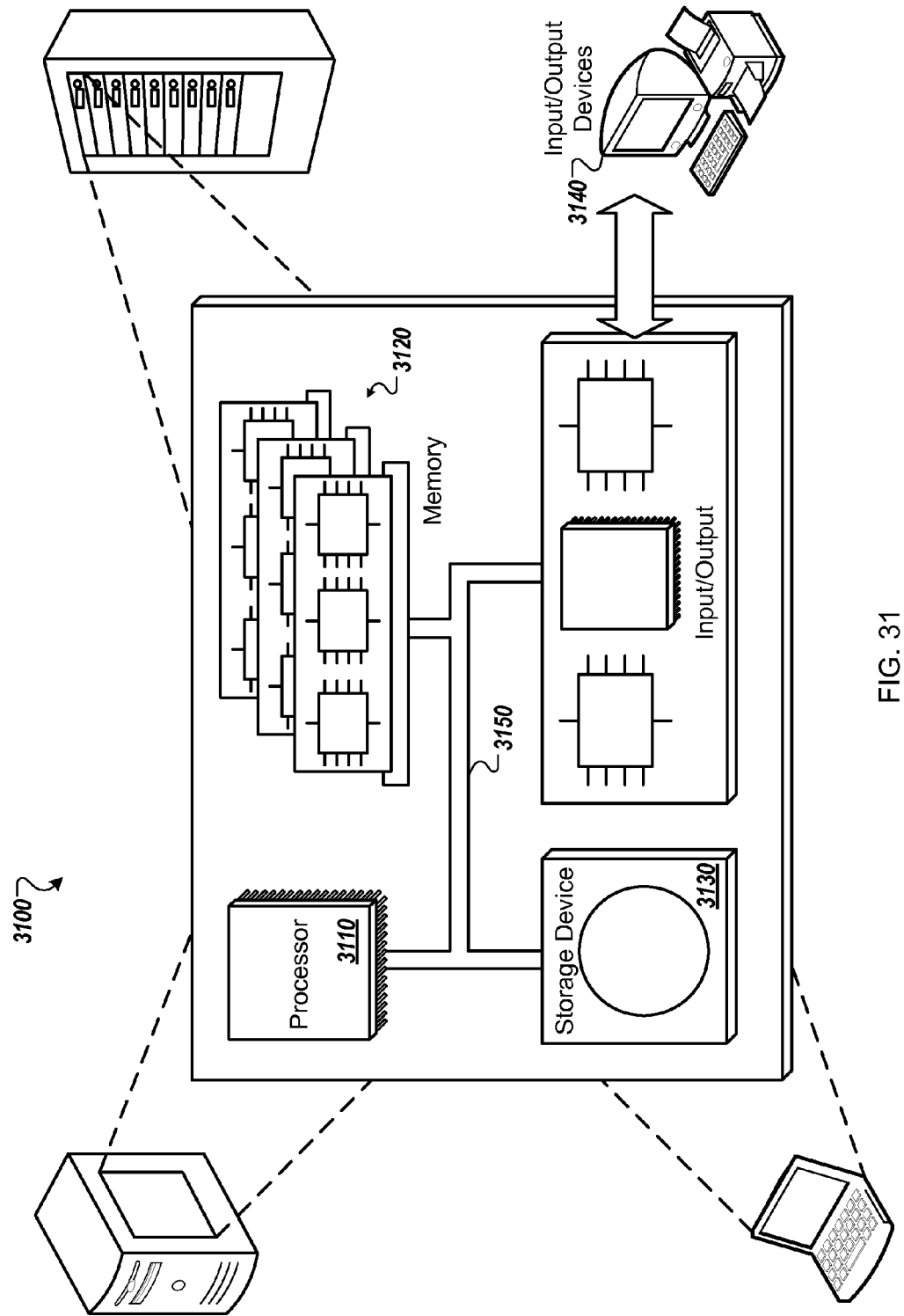

FIG. 31 is a schematic diagram of an example of a generic computer system 3100. The system 3100 can be used for the operations described in association with the processes 200, 300, 400, 2100, 2200, 2300, 2500, and 2700, according to one implementation. For example, the system 3100 may be included in the system 100.

The system 3100 includes a processor 3110, a memory 3120, a storage device 3130, and an input/output device 3140. Each of the components 3110, 3120, 3130, and 3140 are interconnected using a system bus 3150. The processor 3110 is capable of processing instructions for execution within the system 3100. In one implementation, the processor 3110 is a single-threaded processor. In another implementation, the processor 3110 is a multi-threaded processor. The processor 3110 is capable of processing instructions stored in the memory 3120 or on the storage device 3130 to display graphical information for a user interface on the input/output device 3140, which may include a display.

The memory 3120 stores information within the system 3100. In one implementation, the memory 3120 is a computer-readable medium. In one implementation, the memory 3120 is a volatile memory unit. In another implementation, the memory 3120 is a non-volatile memory unit.

The storage device 3130 is capable of providing mass storage for the system 3100. In one implementation, the storage device 3130 is a computer-readable medium. In various different implementations, the storage device 3130 may be a floppy disk device, a hard disk device, an optical disk device, or a tape device.

The input/output device 3140 provides input/output operations for the system 3100. In one implementation, the input/output device 3140 includes a keyboard and/or pointing device. In another implementation, the input/output device 3140 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output. The described features can be implemented in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The elements of a computer may include a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

A number of implementations have been described. Nevertheless, it will be understood that various modifications may be made without departing from the spirit and scope of the disclosure. Accordingly, other implementations are within the scope of the following claims.

What is claimed is:

1. A system comprising:
    at least one computer; and
    at least one computer-readable medium coupled to the at least one computer having instructions stored thereon which, when executed by the at least one computer, causes the at least one computer to perform operations comprising:
        accessing a design of a software application prior to development of code for the software application, the design defining an architecture for the software application in a modeling language;
        accessing design quality rules that are defined to evaluate quality of designs of software applications and that pertain to a rigidity design quality attribute, a performance design quality attribute, and a security design quality attribute;
        applying the accessed design quality rules to the accessed design of the software application to detect violations of the accessed design quality rules;
        accumulating, for the rigidity design quality attribute, detected violations that pertain to extensibility of the design of the software application or detected violations that pertain to modifiability of the design of the software application;
        accumulating, for the performance design quality attribute, detected violations that pertain to the performance design quality attribute;
        accumulating, for the security design quality attribute, detected violations that pertain to the security design quality attribute;
        computing a rigidity metric for the accessed design of the software application based on the accumulated violations that pertain to the extensibility of the design of the software application or the accumulated violations that pertain to the modifiability of the design of the software application, the rigidity metric quantifying how one or more design defects in the accessed design of the software application impact at least one of the extensibility or the modifiability of the software application;
        computing, for the performance design quality attribute and based on the violations accumulated for the performance design quality attribute, a performance metric that reflects software design quality in terms of the performance design quality attribute;
        computing, for the security design quality attribute and based on the violations accumulated for the security design quality attribute, a security metric that reflects software design quality in terms of the security design quality attribute;
        computing a design quality composite index by combining the rigidity metric, the performance metric, and the security metric;
        providing output describing one or more violations of the accessed design quality rules detected and related to design quality of the software application based on the computed rigidity metric, the performance metric, and the security metric;
        based on the output, receiving user input to address the one or more violations of the accessed design quality rules; and
        subsequent to receiving the user input to address the one or more violations of the accessed design quality rules:
            obtaining a recovered software design by reverse engineering code developed for the software application based on a version of the design of the software application stored after receiving the user input to address the one or more violations of the accessed design quality rules, the recovered software design defining an architecture of the code developed for the software application in the modeling language,
            determining an existence of the version of the design of the software application stored after receiving the user input to address the one or more violations of the accessed design quality rules,
            in response to determining the existence of the version of the design of the software application stored after receiving the user input to address the one or more violations of the accessed design quality rules, comparing the recovered software design with a version of the design of the software application stored after receiving the user input to address the one or more violations of the accessed design quality rules;
            based on comparison results, detecting inconsistencies between the recovered software design and the version of the design of the software application stored after receiving the user input to address the one or more violations of the accessed design quality rules, and
            providing output describing one or more inconsistencies between the recovered software design and the version of the design of the software application stored after receiving the user input to address the one or more violations of the accessed design quality rules.

2. The system of claim 1 wherein the operations further comprise:
    applying the accessed design quality rules to the recovered software design to detect violations of the accessed design quality rules.

3. The system of claim 1 wherein applying the accessed design quality rules to the accessed design of the software application to detect violations of the accessed design quality rules comprises:
initializing a violation list for the accessed design of the software application;
for each rule in the accessed design quality rules:
identifying a type of design element on which the rule is applied;
identifying design elements of the identified type in the accessed design of the software application;
for each identified design element:
applying the rule on the identified design element;
determining whether the rule has been violated by the identified design element based on applying the rule on the identified design element; and
conditioned on a determination that the rule has been violated by the identified design element, adding a violation to the violation list based on the rule and the identified design element.

4. The system of claim 3 wherein applying the accessed design quality rules to the accessed design of the software application to detect violations of the accessed design quality rules further comprises:
for each identified design element, determining whether the identified design element has been identified to be excluded from design quality analysis,
wherein applying the rule on the identified design element and determining whether the rule has been violated are bypassed for the identified design element based on a determination that the identified design element has been excluded from design quality analysis.

5. The system of claim 1 wherein providing output describing one or more violations of the accessed design quality rules detected comprises:
accessing, from a database, help information related to a detected violation of the accessed design quality rules;
generating a context specific help message for the detected violation of the accessed design quality rules based on the accessed help information; and
providing output based on the generated context specific help message for the detected violation.

6. The system of claim 1 wherein providing output describing one or more violations of the accessed design quality rules detected comprises:
accessing, from a database, refactoring information related to a detected violation of the accessed design quality rules;
generating a context specific refactoring suggestion for the detected violation of the accessed design quality rules based on the accessed refactoring information, the generated context specific refactoring suggestion describing a suggestion for correcting the detected violation of the accessed design quality rules; and
providing output based on the generated context specific refactoring suggestion for the detected violation.

7. The system of claim 1 wherein receiving user input to address the one or more violations of the accessed design quality rules comprises receiving user input to ignore a detected violation of the accessed design quality rules,
wherein receiving user input to ignore a detected violation of the accessed design quality rules comprises:
requiring user input of a rationale for ignoring the detected violation to allow the detected violation to be ignored;
receiving user input describing the rationale for ignoring the detected violation; and
recording the rationale for ignoring the detected violation when ignoring the detected violation.

8. The system of claim 7 wherein recording the rationale for ignoring the detected violation comprises:
adding, to an activity log, an entry to indicate that the detected violation has been ignored and the rationale for ignoring the detected violation; and
enabling a reviewer to review the activity log including the entry that indicates the detected violation has been ignored and the rationale for ignoring the detected violation.

9. The system of claim 1 wherein the operations further comprise:
subsequent to receiving the user input to address the one or more violations of the accessed design quality rules, generating an unresolved violations report that specifies at least one detected violation that has not been corrected in the design of the software application; and
providing the unresolved violations report to a reviewer.

10. The system of claim 1 wherein comparing the recovered software design with the version of the design of the software application stored after receiving the user input to address the one or more violations of the accessed design quality rules comprises comparing structural metrics of the recovered software design with structural metrics of the version of the design of the software application stored after receiving the user input to address the one or more violations of the accessed design quality rules.

11. The system of claim 1, wherein comparing the recovered software design with a version of the design of the software application stored after receiving the user input to address the one or more violations of the accessed design quality rules, comprises:
applying the accessed design quality rules to the recovered software design to detect violations of the accessed design quality rules;
detecting violations of the accessed design quality rules for the recovered software design;
applying the accessed design quality rules to the version of the design of the software application stored after receiving the user input to address the one or more violations of the accessed design quality rules to detect violations of the accessed design quality rules;
detecting violations of the accessed design quality rules for the version of the design of the software application stored after receiving the user input to address the one or more violations; and
comparing the detected violations of the accessed design quality rules for the recovered software design with the detected violations of the accessed design quality rules for the version of the design of the software application stored after receiving the user input to address the one or more violations.

12. The system of claim 1, wherein accumulating, for the rigidity design quality attribute, the detected violations that pertain to extensibility of the design of the software application or the detected violations that pertain to modifiability of the design of the software application, comprises:
aggregating, for the rigidity design quality attribute, the detected violations across each class object in terms of an object oriented programming language included in the accessed design of the software application; and
accumulating, for the rigidity design quality attribute, the detected violations across the design of the software application using the aggregated violations for each class object included in the accessed design of the software application.

13. The system of claim 1 wherein combining the performance metric, the security metric, and the rigidity metric comprises:
   accessing a performance weighting factor, a security weighting factor, and a rigidity weighting factor;
   multiplying the performance metric by the performance weighting factor to determine a performance value;
   multiplying the security metric by the security weighting factor to determine a security value;
   multiplying the rigidity metric by the rigidity weighting factor to determine a rigidity value; and
   summing the performance value, the security value, and the rigidity value to determine the design quality composite index.

14. The system of claim 1:
   wherein accessing design quality rules that are defined to evaluate quality of designs of software applications comprises:
      accessing design quality rules that pertain to extensibility of the design of the software application, and
      accessing design quality rules that pertain to modifiability of the design of the software application;
   wherein accumulating, for the rigidity design quality attribute, the detected violations that pertain to extensibility of the design of the software application or the detected violations that pertain to modifiability of the design of the software application, comprises:
      accumulating detected violations that pertain to the extensibility of the design of the software application, and
      accumulating detected violations that pertain to the modifiability of the design of the software application; and
   wherein computing a rigidity metric for the accessed design of the software application comprises:
      computing an extensibility metric for the accessed design of the software application based on the accumulated violations that pertain to the extensibility of the design of the software application,
      computing a modifiability metric for the accessed design of the software application based on the accumulated violations that pertain to the modifiability of the design of the software application, and
      combining the extensibility metric and the modifiability metric.

15. The system of claim 14, wherein combining the extensibility metric and the modifiability metric comprises:
   accessing an extensibility weighting factor and a modifiability weighting factor;
   multiplying the extensibility metric by the extensibility weighting factor to determine an extensibility value;
   multiplying the modifiability metric by the modifiability weighting factor to determine a modifiability value; and
   summing the extensibility value and the modifiability value to determine the rigidity metric.

16. The system of claim 1 wherein the operations further comprise determining an effort estimation value associated with the accessed design of the software application that accounts for the computed rigidity metric.

17. The system of claim 16 wherein determining an effort estimation value associated with the accessed design of the software application that accounts for the computed rigidity metric comprises:
   determining an effort estimation value for a change to the accessed design of the software application;
   increasing the determined effort estimation value based on the computed rigidity metric; and
   providing output related to the change to the accessed design of the software application based on the increased effort estimation value.

18. A computer-implemented method comprising:
   accessing a design of a software application prior to development of code for the software application, the design defining an architecture for the software application in a modeling language;
   accessing design quality rules that are defined to evaluate quality of designs of software applications and that pertain to a rigidity design quality attribute, a performance design quality attribute, and a security design quality attribute;
   applying the accessed design quality rules to the accessed design of the software application to detect violations of the accessed design quality rules;
   accumulating, for the rigidity design quality attribute, detected violations that pertain to extensibility of the design of the software application or detected violations that pertain to modifiability of the design of the software application;
   accumulating, for the performance design quality attribute, detected violations that pertain to the performance design quality attribute;
   accumulating, for the security design quality attribute, detected violations that pertain to the security design quality attribute;
   computing a rigidity metric for the accessed design of the software application based on the accumulated violations that pertain to the extensibility of the design of the software application or the accumulated violations that pertain to the modifiability of the design of the software application, the rigidity metric quantifying how one or more design defects in the accessed design of the software application impact at least one of the extensibility or the modifiability of the software application;
   computing, for the performance design quality attribute and based on the violations accumulated for the performance design quality attribute, a performance metric that reflects software design quality in terms of the performance design quality attribute;
   computing, for the security design quality attribute and based on the violations accumulated for the security design quality attribute, a security metric that reflects software design quality in terms of the security design quality attribute;
   computing a design quality composite index by combining the rigidity metric, the performance metric, and the security metric;
   providing output describing one or more violations of the accessed design quality rules detected and related to design quality of the software application based on the computed rigidity metric, the performance metric, and the security metric;
   based on the output, receiving user input to address the one or more violations of the accessed design quality rules; and
   subsequent to receiving the user input to address the one or more violations of the accessed design quality rules:
      obtaining a recovered software design by reverse engineering code developed for the software application based on a version of the design of the software application stored after receiving the user input to address the one or more violations of the accessed design quality rules, the recovered software design defining an architecture of the code developed for the software application in the modeling language, determining an existence of the version of the design of the software application stored after receiving the user input to address the one or more violations of the accessed design quality rules, in response to determining the existence of the version of the design of the software application stored after receiving the user input to address the one or more violations of the accessed design quality rules, comparing the recovered software design with a version of the design of the software application stored after receiving the user input to address the one or more violations of the accessed design quality rules;

based on comparison results, detecting inconsistencies between the recovered software design and the version of the design of the software application stored after receiving the user input to address the one or more violations of the accessed design quality rules, and providing output describing one or more inconsistencies between the recovered software design and the version of the design of the software application stored after receiving the user input to address the one or more violations of the accessed design quality rules.

19. A non-transitory computer-readable medium storing software comprising instructions executable by one or more computers which, upon such execution, cause the one or more computers to perform operations comprising:

accessing a design of a software application prior to development of code for the software application, the design defining an architecture for the software application in a modeling language;

accessing design quality rules that are defined to evaluate quality of designs of software applications and that pertain to a rigidity design quality attribute, a performance design quality attribute, and a security design quality attribute;

applying the accessed design quality rules to the accessed design of the software application to detect violations of the accessed design quality rules;

accumulating, for the rigidity design quality attribute, detected violations that pertain to extensibility of the design of the software application or detected violations that pertain to modifiability of the design of the software application;

accumulating, for the performance design quality attribute, detected violations that pertain to the performance design quality attribute;

accumulating, for the security design quality attribute, detected violations that pertain to the security design quality attribute;

computing a rigidity metric for the accessed design of the software application based on the accumulated violations that pertain to the extensibility of the design of the software application or the accumulated violations that pertain to the modifiability of the design of the software application, the rigidity metric quantifying how one or more design defects in the accessed design of the software application impact at least one of the extensibility or the modifiability of the software application;

computing, for the performance design quality attribute and based on the violations accumulated for the performance design quality attribute, a performance metric that reflects software design quality in terms of the performance design quality attribute;

computing, for the security design quality attribute and based on the violations accumulated for the security design quality attribute, a security metric that reflects software design quality in terms of the security design quality attribute;

computing a design quality composite index by combining the rigidity metric, the performance metric, and the security metric;

providing output describing one or more violations of the accessed design quality rules detected and related to design quality of the software application based on the computed rigidity metric, the performance metric, and the security metric;

based on the output, receiving user input to address the one or more violations of the accessed design quality rules; and subsequent to receiving the user input to address the one or more violations of the accessed design quality rules:

obtaining a recovered software design by reverse engineering code developed for the software application based on a version of the design of the software application stored after receiving the user input to address the one or more violations of the accessed design quality rules, the recovered software design defining an architecture of the code developed for the software application in the modeling language, determining an existence of the version of the design of the software application stored after receiving the user input to address the one or more violations of the accessed design quality rules, in response to determining the existence of the version of the design of the software application stored after receiving the user input to address the one or more violations of the accessed design quality rules, comparing the recovered software design with a version of the design of the software application stored after receiving the user input to address the one or more violations of the accessed design quality rules;

based on comparison results, detecting inconsistencies between the recovered software design and the version of the design of the software application stored after receiving the user input to address the one or more violations of the accessed design quality rules, and providing output describing one or more inconsistencies between the recovered software design and the version of the design of the software application stored after receiving the user input to address the one or more violations of the accessed design quality rules.

* * * * *

UNITED STATES PATENT AND TRADEMARK OFFICE
CERTIFICATE OF CORRECTION

PATENT NO. : 8,839,211 B2
APPLICATION NO. : 13/050339
DATED : September 16, 2014
INVENTOR(S) : Vikrant Shyamkant Kaulgud et al.

Page 1 of 1

It is certified that error appears in the above-identified patent and that said Letters Patent is hereby corrected as shown below:

In The Claims

In column 34, line 5, claim 18, delete "accessing" and insert -- accessing, by one or more computers, --, therefor.

In column 34, line 9, claim 18, delete "accessing" and insert -- accessing, by the one or more computers, --, therefor.

In column 34, line 14, claim 18, delete "applying" and insert -- applying, by the one or more computers, --, therefor.

In column 34, line 50, claim 18, delete "providing" and insert -- providing, by the one or more computers, --, therefor.

In column 34, line 60, claim 18, delete "obtaining" and insert -- obtaining, by the one or more computers, --, therefor.

In column 35, line 1, claim 18, delete "determining" and insert -- determining, by the one or more computers, --, therefor.

In column 35, lines 8-9, claim 18, delete "comparing" and insert -- comparing, by the one or more computers, --, therefor.

In column 35, line 13, claim 18, delete "detecting" and insert -- detecting, by the one or more computers, --, therefor.

In column 35, line 19, claim 18, delete "providing" and insert -- providing, by the one or more computers, --, therefor.

Signed and Sealed this
Twenty-seventh Day of January, 2015

Michelle K. Lee
*Deputy Director of the United States Patent and Trademark Office*